(12) United States Patent
Neofytides et al.

(10) Patent No.: US 7,398,252 B2
(45) Date of Patent: Jul. 8, 2008

(54) AUTOMATED GROUP PAYMENT

(75) Inventors: Cheryl L. Neofytides, Floral Park, NY (US); Aamer Ali Baig, Forest Hills, NY (US); Peter M. Karas, Lakewood, CO (US); James E. Cowell, Littleton, CO (US); James R. Yoder, Chicago, IL (US); Matt F. Golub, Tera Fly, NJ (US)

(73) Assignee: First Data Corporation, Englewood, CO (US)

( * ) Notice: Subject to any disclaimer, the term of this patent is extended or adjusted under 35 U.S.C. 154(b) by 1552 days.

(21) Appl. No.: 10/045,633

(22) Filed: Oct. 26, 2001

(65) Prior Publication Data

US 2002/0152176 A1 Oct. 17, 2002

(51) Int. Cl.
*G06Q 40/00* (2006.01)
(52) U.S. Cl. .................... 705/64; 705/26; 395/650; 283/58; 364/408
(58) Field of Classification Search ................. 705/64, 705/26; 395/650; 283/58; 364/408
See application file for complete search history.

(56) References Cited

U.S. PATENT DOCUMENTS

| | | |
|---|---|---|
| 3,599,151 A | 8/1971 | Harr |
| 3,783,755 A | 1/1974 | Lagin |
| 3,833,395 A | 9/1974 | Gosnell |
| 4,032,931 A | 6/1977 | Haker |
| 4,321,672 A | 3/1982 | Braun et al. |
| 4,454,414 A | 6/1984 | Benton |
| 4,562,340 A | 12/1985 | Tateisi et al. |
| 4,562,341 A | 12/1985 | Ohmae et al. |
| 4,630,200 A | 12/1986 | Ohmae et al. |
| 4,633,397 A | 12/1986 | Macco |
| 4,678,895 A | 7/1987 | Tateisi et al. |
| 4,722,554 A | 2/1988 | Pettit |

(Continued)

FOREIGN PATENT DOCUMENTS

EP 0 481 135 A1 4/1992

(Continued)

OTHER PUBLICATIONS

Arthas Corp., *dotBank, The Way to Send and Receive Money on the Internet*, downloaded from website http://www.dotbank.com/ on Feb. 7, 2000.

(Continued)

*Primary Examiner*—Harish T. Dass
(74) *Attorney, Agent, or Firm*—Townsend and Townsend and Crew LLP

(57) ABSTRACT

According to the invention, a process for transferring credit from a sender to a number of recipients using a wide-area computer network is disclosed. In one step, a server computer system receives information from the sender to transfer credit to the number of recipients. The information includes a unique identifier for each of the number of recipients and a credit amount. A first handler chosen by the sender and a second handler chosen by one of the number of recipients are determined. A credit transfer from the first handler is requested. The credit amount from the first handler is received at the server computer system. The credit amount is sent to the second handler associated with the one of the number of recipients.

17 Claims, 15 Drawing Sheets

U.S. PATENT DOCUMENTS

| | | | |
|---|---|---|---|
| 4,812,628 A | 3/1989 | Boston et al. |
| 4,902,881 A | 2/1990 | Janku |
| 4,961,142 A | 10/1990 | Elliott et al. |
| 4,972,318 A | 11/1990 | Brown et al. |
| 5,021,967 A | 6/1991 | Smith |
| 5,053,607 A | 10/1991 | Carlson et al. |
| 5,119,293 A | 6/1992 | Hammond |
| 5,175,682 A | 12/1992 | Higashiyama et al. |
| 5,220,501 A | 6/1993 | Lawlor et al. |
| 5,283,829 A | 2/1994 | Anderson |
| 5,326,959 A | 7/1994 | Perazza |
| 5,350,906 A | 9/1994 | Brody et al. |
| 5,367,452 A | 11/1994 | Gallery et al. |
| 5,408,077 A | 4/1995 | Campo et al. |
| 5,426,594 A | 6/1995 | Wright et al. |
| 5,448,043 A | 9/1995 | Nakano et al. |
| 5,461,217 A | 10/1995 | Claus |
| 5,464,971 A | 11/1995 | Sutcliffe et al. |
| 5,465,206 A | 11/1995 | Hilt et al. |
| 5,477,037 A | 12/1995 | Berger |
| 5,477,038 A | 12/1995 | Levine et al. |
| 5,484,988 A | 1/1996 | Hills et al. |
| 5,491,325 A | 2/1996 | Huang et al. |
| 5,504,677 A | 4/1996 | Pollin |
| 5,510,979 A | 4/1996 | Moderi et al. |
| 5,513,117 A | 4/1996 | Small |
| 5,524,073 A | 6/1996 | Stambler |
| 5,555,496 A | 9/1996 | Tackbary et al. |
| 5,570,465 A | 10/1996 | Tsakanikas |
| 5,577,109 A | 11/1996 | Stimson et al. |
| 5,604,802 A | 2/1997 | Holloway |
| 5,622,388 A | 4/1997 | Alcordo |
| 5,629,982 A | 5/1997 | Micali |
| 5,638,283 A | 6/1997 | Herbert |
| 5,649,117 A | 7/1997 | Landry |
| 5,650,604 A | 7/1997 | Marcous et al. |
| 5,657,201 A | 8/1997 | Kochis |
| 5,664,110 A | 9/1997 | Green et al. |
| 5,677,955 A | 10/1997 | Doggett et al. |
| 5,679,940 A | 10/1997 | Templeton et al. |
| 5,699,528 A | 12/1997 | Hogan |
| 5,717,868 A | 2/1998 | James |
| 5,721,768 A | 2/1998 | Stimson et al. |
| 5,732,136 A | 3/1998 | Murphree et al. |
| 5,732,400 A | 3/1998 | Mandler et al. |
| 5,745,886 A | 4/1998 | Rosen |
| 5,757,917 A | 5/1998 | Rose et al. |
| 5,764,888 A | 6/1998 | Bolan et al. |
| 5,774,879 A | 6/1998 | Custy et al. |
| 5,778,067 A | 7/1998 | Jones et al. |
| 5,779,379 A | 7/1998 | Mason et al. |
| 5,783,808 A | 7/1998 | Josephson |
| 5,787,403 A | 7/1998 | Randle |
| 5,794,207 A | 8/1998 | Walker et al. |
| 5,815,657 A | 9/1998 | Williams et al. |
| 5,825,003 A | 10/1998 | Jennings et al. |
| 5,825,617 A | 10/1998 | Kochis et al. |
| 5,826,241 A | 10/1998 | Stein et al. |
| 5,828,875 A | 10/1998 | Halvarsson et al. |
| 5,832,463 A | 11/1998 | Funk |
| 5,870,718 A | 2/1999 | Spector |
| 5,875,435 A | 2/1999 | Brown |
| 5,878,211 A | 3/1999 | Delagrange et al. |
| 5,880,446 A | 3/1999 | Mori et al. |
| 5,884,288 A * | 3/1999 | Chang et al. ................. 705/40 |
| 5,893,080 A | 4/1999 | McGurl et al. |
| 5,896,298 A | 4/1999 | Richter |
| 5,897,622 A | 4/1999 | Blinn et al. |
| 5,897,625 A | 4/1999 | Gustin et al. |
| 5,897,989 A | 4/1999 | Beecham |
| 5,898,154 A | 4/1999 | Rosen |
| 5,899,980 A | 5/1999 | Wilf et al. |
| 5,899,982 A | 5/1999 | Randle |
| 5,902,983 A | 5/1999 | Crevelt et al. |
| 5,903,881 A | 5/1999 | Schrader et al. |
| 5,909,492 A | 6/1999 | Payne et al. |
| 5,909,673 A | 6/1999 | Gregory |
| 5,910,988 A | 6/1999 | Ballard |
| 5,913,202 A | 6/1999 | Motoyama |
| 5,915,023 A | 6/1999 | Bernstein |
| 5,920,629 A | 7/1999 | Rosen |
| 5,920,847 A | 7/1999 | Kolling et al. |
| 5,920,848 A | 7/1999 | Schutzer et al. |
| 5,936,221 A | 8/1999 | Corder et al. |
| 5,937,396 A | 8/1999 | Konya |
| 5,946,669 A | 8/1999 | Polk |
| 5,949,044 A | 9/1999 | Walker et al. |
| 5,952,639 A | 9/1999 | Ohki et al. |
| 5,953,709 A | 9/1999 | Gilbert et al. |
| 5,953,710 A | 9/1999 | Fleming |
| 5,960,412 A | 9/1999 | Tackbary et al. |
| 5,963,647 A | 10/1999 | Downing et al. |
| 5,966,698 A | 10/1999 | Pollin |
| 5,974,146 A | 10/1999 | Randle et al. |
| 5,974,194 A | 10/1999 | Tackbary et al. |
| RE36,365 E | 11/1999 | Levine et al. |
| 5,987,426 A | 11/1999 | Goodwin, III |
| 5,993,047 A | 11/1999 | Novogrod et al. |
| 5,999,624 A | 12/1999 | Hopkins |
| 6,003,763 A | 12/1999 | Gallagher et al. |
| 6,011,833 A | 1/2000 | West |
| 6,012,048 A | 1/2000 | Gustin et al. |
| 6,015,087 A | 1/2000 | Seifert et al. |
| 6,027,216 A | 2/2000 | Guyton |
| 6,029,150 A | 2/2000 | Kravitz |
| 6,030,000 A | 2/2000 | Diamond |
| 6,032,133 A | 2/2000 | Hilt et al. |
| 6,032,137 A | 2/2000 | Ballard |
| 6,035,285 A | 3/2000 | Schlect et al. |
| 6,035,406 A | 3/2000 | Moussa et al. |
| 6,039,245 A | 3/2000 | Symonds et al. |
| 6,039,250 A | 3/2000 | Ito et al. |
| 6,044,360 A | 3/2000 | Picciallo |
| 6,044,362 A | 3/2000 | Neely |
| 6,045,039 A | 4/2000 | Stinson et al. |
| 6,058,417 A | 5/2000 | Hess et al. |
| 6,064,990 A | 5/2000 | Goldsmith |
| 6,070,150 A | 5/2000 | Remington et al. |
| 6,070,156 A | 5/2000 | Hartsell et al. |
| 6,070,798 A | 6/2000 | Nethery |
| 6,078,907 A | 6/2000 | Lamm |
| 6,081,790 A | 6/2000 | Rosen |
| 6,088,683 A | 7/2000 | Jalili |
| 6,088,684 A | 7/2000 | Custy et al. |
| 6,097,834 A | 8/2000 | Krouse et al. |
| 6,098,053 A | 8/2000 | Slater |
| 6,106,020 A | 8/2000 | Leef et al. |
| 6,119,106 A | 9/2000 | Mersky et al. |
| 6,119,931 A | 9/2000 | Novogrod |
| 6,122,625 A | 9/2000 | Rosen |
| 6,128,603 A | 10/2000 | Dent et al. |
| 6,134,561 A | 10/2000 | Brandien et al. |
| 6,145,738 A | 11/2000 | Stinson et al. |
| 6,148,377 A | 11/2000 | Carter et al. |
| 6,149,056 A | 11/2000 | Stinson et al. |
| 6,164,528 A | 12/2000 | Hills et al. |
| 6,167,386 A | 12/2000 | Brown |
| 6,173,272 B1 | 1/2001 | Thomas et al. |
| 6,175,823 B1 | 1/2001 | Van Dusen |
| 6,189,787 B1 | 2/2001 | Dorf |
| 6,193,152 B1 | 2/2001 | Fernando et al. |
| 6,199,761 B1 | 3/2001 | Drexler |
| 6,202,054 B1 | 3/2001 | Lawlor et al. |
| 6,206,283 B1 | 3/2001 | Bansal et al. |

| | | | | | | |
|---|---|---|---|---|---|---|
| RE37,122 E | 4/2001 | Levine et al. | | 2002/0087462 A1 | 7/2002 | Stoutenburg et al. |
| 6,223,168 B1 | 4/2001 | McGurl et al. | | 2002/0087463 A1 | 7/2002 | Fitzgerald et al. |
| 6,246,996 B1 | 6/2001 | Stein et al. | | 2002/0087467 A1 | 7/2002 | Muscavage et al. |
| 6,247,047 B1 | 6/2001 | Wolff | | 2002/0104026 A1 | 8/2002 | Barra et al. |
| 6,260,024 B1 | 7/2001 | Shkedy | | 2002/0111908 A1 | 8/2002 | Milberger et al. |
| 6,263,446 B1 | 7/2001 | Kausik et al. | | 2002/0152168 A1 | 10/2002 | Neofytides et al. |
| 6,269,369 B1 | 7/2001 | Robertson | | 2002/0152176 A1 | 10/2002 | Neofytides et al. |
| 6,275,829 B1 | 8/2001 | Angiulo et al. | | 2002/0153414 A1 | 10/2002 | Stoutenburg et al. |
| 6,286,756 B1 | 9/2001 | Stinson et al. | | 2002/0161702 A1 | 10/2002 | Milberger et al. |
| 6,289,322 B1 | 9/2001 | Kitchen et al. | | 2003/0024979 A1 | 2/2003 | Hansen et al. |
| 6,292,789 B1 | 9/2001 | Schutzer | | 2003/0028491 A1 | 2/2003 | Cooper |
| 6,295,522 B1 | 9/2001 | Boesch | | 2003/0055780 A1 | 3/2003 | Hansen et al. |
| 6,305,604 B1 | 10/2001 | Ono | | 2003/0069856 A1 | 4/2003 | Seifert et al. |
| 6,308,887 B1 | 10/2001 | Korman et al. | | 2003/0074311 A1 | 4/2003 | Saylors et al. |
| 6,314,169 B1 | 11/2001 | Schelberg, Jr. et al. | | 2003/0111529 A1 | 6/2003 | Templeton et al. |
| 6,317,745 B1 | 11/2001 | Thomas et al. | | 2003/0120777 A1 | 6/2003 | Thompson et al. |
| 6,321,211 B1 | 11/2001 | Dodd | | 2003/0126036 A1 | 7/2003 | Mascavage et al. |
| 6,321,984 B1 | 11/2001 | McCall et al. | | 2003/0126075 A1 | 7/2003 | Mascavage et al. |
| 6,324,525 B1 | 11/2001 | Kramer et al. | | 2003/0126083 A1 | 7/2003 | Seifert et al. |
| 6,327,570 B1 | 12/2001 | Stevens | | 2003/0130907 A1 | 7/2003 | Karas et al. |
| 6,327,575 B1 | 12/2001 | Katz | | 2003/0130940 A1 | 7/2003 | Hansen et al. |
| 6,339,766 B1 | 1/2002 | Gephart | | 2003/0130948 A1 | 7/2003 | Algiene et al. |
| 6,343,279 B1 | 1/2002 | Bissonette et al. | | 2003/0135459 A1 | 7/2003 | Abelman et al. |
| 6,347,305 B1 | 2/2002 | Watkins | | 2003/0149662 A1 | 8/2003 | Shore |
| 6,351,739 B1 | 2/2002 | Egendorf | | 2003/0154164 A1 | 8/2003 | Mascavage et al. |
| 6,356,878 B1 | 3/2002 | Walker et al. | | 2003/0167237 A1 | 9/2003 | Degen et al. |
| 6,360,254 B1 | 3/2002 | Linden et al. | | 2003/0177067 A1 | 9/2003 | Cowell et al. |
| 6,367,693 B1 | 4/2002 | Novogrod | | 2003/0187789 A1 | 10/2003 | Karas et al. |
| 6,394,343 B1 | 5/2002 | Berg et al. | | 2003/0187791 A1 | 10/2003 | Weichert et al. |
| 6,405,181 B2 | 6/2002 | Lent et al. | | 2003/0187792 A1 | 10/2003 | Hansen et al. |
| 6,408,284 B1 | 6/2002 | Hilt et al. | | 2003/0195811 A1 | 10/2003 | Hayes et al. |
| 6,411,942 B1 | 6/2002 | Fujimoto | | 2003/0208445 A1 | 11/2003 | Compiano |
| 6,415,271 B1 | 7/2002 | Turk et al. | | 2003/0222135 A1 | 12/2003 | Stoutenburg et al. |
| 6,438,586 B1 | 8/2002 | Hass | | 2003/0222136 A1 | 12/2003 | Bolle et al. |
| 6,449,599 B1 | 9/2002 | Payne et al. | | 2003/0225689 A1 | 12/2003 | MacFarlane et al. |
| 6,453,300 B2 | 9/2002 | Simpson | | 2004/0015438 A1 | 1/2004 | Compiano |
| 6,473,500 B1 | 10/2002 | Risafi et al. | | 2004/0024701 A1 | 2/2004 | Hansen et al. |
| 6,484,936 B1 | 11/2002 | Nicoll et al. | | 2004/0059672 A1 | 3/2004 | Baig et al. |
| 6,488,203 B1 | 12/2002 | Stoutenburg et al. | | 2004/0068437 A1 | 4/2004 | McGee et al. |
| 6,502,747 B1 | 1/2003 | Stoutenburg et al. | | 2004/0078327 A1 | 4/2004 | Frazier et al. |
| 6,510,453 B1 | 1/2003 | Apfel et al. | | 2004/0088248 A1 | 5/2004 | Cutler |
| 6,539,363 B1 | 3/2003 | Allgeier et al. | | 2004/0088261 A1 | 5/2004 | Moore et al. |
| 6,547,132 B1 | 4/2003 | Templeton et al. | | 2004/0098328 A1 | 5/2004 | Grant et al. |
| 6,549,119 B1 | 4/2003 | Turner | | 2004/0098335 A1 | 5/2004 | Michelsen |
| 6,554,184 B1 | 4/2003 | Amos | | 2004/0107165 A1 | 6/2004 | Blair et al. |
| 6,575,362 B1 | 6/2003 | Bator et al. | | 2004/0117302 A1 | 6/2004 | Weichert et al. |
| 6,609,113 B1 | 8/2003 | O'Leary et al. | | 2004/0138947 A1 | 7/2004 | McGee et al. |
| RE38,255 E | 9/2003 | Levine et al. | | 2004/0139008 A1 | 7/2004 | Muscavage et al. |
| 6,615,189 B1 | 9/2003 | Phillips et al. | | 2004/0143552 A1 | 7/2004 | Weichert et al. |
| 6,618,705 B1 | 9/2003 | Wang et al. | | 2004/0148286 A1 | 7/2004 | Rogers |
| 6,736,314 B2 | 5/2004 | Cooper et al. | | 2004/0153398 A1 | 8/2004 | Baumgartner et al. |
| 6,761,309 B2 | 7/2004 | Stoutenburg et al. | | 2004/0158521 A1 | 8/2004 | Newton et al. |
| 6,761,311 B1 | 7/2004 | Algiene et al. | | 2004/0167860 A1 | 8/2004 | Baxter et al. |
| 6,814,282 B2 | 11/2004 | Seifert et al. | | 2004/0193897 A1 | 9/2004 | Van Volkenburgh |
| 6,827,260 B2 | 12/2004 | Stoutenburg et al. | | 2004/0210476 A1 | 10/2004 | Blair et al. |
| 6,829,588 B1 | 12/2004 | Stoutenburg et al. | | 2004/0210506 A1 | 10/2004 | Algiene et al. |
| 6,847,947 B1 | 1/2005 | Kambour et al. | | 2004/0210521 A1 | 10/2004 | Crea et al. |
| 6,886,742 B2 | 5/2005 | Stoutenburg et al. | | 2004/0210523 A1 | 10/2004 | Gains et al. |
| 6,908,031 B2 | 6/2005 | Seifert et al. | | 2004/0211831 A1 | 10/2004 | Stoutenburg et al. |
| 6,922,673 B2 | 7/2005 | Karas et al. | | 2004/0254833 A1 | 12/2004 | Algiene et al. |
| 6,996,542 B1 * | 2/2006 | Landry .................. 705/40 | | 2005/0017067 A1 | 1/2005 | Weinberger |
| 7,010,512 B1 | 3/2006 | Gillin et al. | | 2005/0027650 A1 | 2/2005 | Walker et al. |
| 7,031,939 B1 | 4/2006 | Gallagher et al. | | 2005/0167481 A1 | 8/2005 | Hansen et al. |
| 7,089,208 B1 | 8/2006 | Levchin et al. | | 2005/0180550 A1 | 8/2005 | McGee et al. |
| 7,249,098 B2 | 7/2007 | Milberger et al. | | 2005/0187929 A1 | 8/2005 | Staggs |
| 2001/0032183 A1 | 10/2001 | Landry et al. | | 2005/0209958 A1 | 9/2005 | Michelsen |
| 2001/0042785 A1 | 11/2001 | Walker et al. | | 2005/0209961 A1 | 9/2005 | Michelsen |
| 2001/0051876 A1 | 12/2001 | Seigel et al. | | | | |
| 2001/0054003 A1 | 12/2001 | Chien et al. | | FOREIGN PATENT DOCUMENTS | | |
| 2002/0023055 A1 | 2/2002 | Antognini et al. | | | | |
| 2002/0046106 A1 | 4/2002 | Ishibashi et al. | | EP | 0 745 961 A2 | 4/1996 |
| 2002/0062285 A1 | 5/2002 | Amann | | EP | 0 745 961 A3 | 7/1998 |
| 2002/0082987 A1 | 6/2002 | Wilson | | EP | 0 949 596 A2 | 10/1999 |

| | | | |
|---|---|---|---|
| EP | 1 077 436 A2 | 2/2001 |
| FR | 2728983 A1 | 7/1996 |
| GB | 2338814 A | 12/1999 |
| JP | 411025171 A | 3/2006 |
| WO | WO 96/26508 A1 | 8/1996 |
| WO | WO 98/49644 A1 | 11/1998 |
| WO | WO 98/50875 A2 | 11/1998 |
| WO | WO 99/22291 A1 | 5/1999 |
| WO | WO 99/28872 A1 | 6/1999 |
| WO | WO 00/22559 A1 | 4/2000 |
| WO | WO 00/46725 A1 | 8/2000 |
| WO | WO 00/54122 A2 | 9/2000 |
| WO | WO 00/67177 A2 | 11/2000 |
| WO | WO 00/79452 A2 | 12/2000 |
| WO | WO 01/04816 A1 | 1/2001 |
| WO | WO 01/39093 A1 | 5/2001 |
| WO | WO 02/05195 A1 | 1/2002 |

OTHER PUBLICATIONS

Confinity, Inc., PayPal.com, How PayPal.com Works, downloaded from website http://www.paypal.com/ on Feb. 7, 2000.

Business Wire, *E-Commerce, Email and E-greeting Cards Combine in New Web Site Designed by Interactive Bureau*; Flooz.com *Features a Fun Online Gift Currency You Send by Email for Any Occasion*, downloaded from website http://www.proquest.umi.com.

X.COM, *Do More with Your Money*, downloaded from website http://www.x.com.

DOTBANK, *The Way to Send and receive Money on the Internet*, downloaded from website http://www.dotbank.com.

"Beaming Money by Email is Web's Next Killer App", PR Newswire, New York, Nov. 16, 1999, p. 1.

"billserv.com Launches bills.com, an Internet Portal for Consumers to Pay all Bills Online at no Cost", Business Editors & High-Tech Writers. Business Wire, New York, Feb. 22, 2000, p. 1.

Amerinet, Inc., "Debit-It!—The Best Idea In Payment Systems Since the Credit Card", downloaded from website http://www.debit.it.com/ on Feb. 7, 2000, 8 pages.

Business Wire, "*E-Commerce, Email and E-greeting Cards Combine in New Web Site Designed by Interactive Bureau*", Sep. 14, 1999 (abstract), [online] [retrieved on May 1, 2002], retrieved from Proquest Database, 2 pages.

Business Wire, "E-Commerce, Email and E-greeting Cards Combine in New Web Site Designed by Interactive Bureau; Flooz.com Features a Fun Online Gift Currency You Send by Email for Any Occasion", downloaded from website http://www.proquest.umi.com.

Dotbank, *The Way to Send and Receive Money on the Internet*, downloaded from website http://www.dotbank.com, Feb. 7, 2000, 6 pages.

http://www.vfi-finance.com/tranz330.htm, Tranz 330 Fast, Low-Cost Transaction Automation At The Point Of Service, VeriFone Finance, Jan. 1999, pp. 1-3, especially pp. 1-2.

Idealab Company, PayMe.com, downloaded from website http://ssl.idealab.com on Feb. 16, 2000, 7 pages.

Intell-A-Check Corp.: "Intell-A-Check!—The Way to get Paid", Intell-A-Check product overview, retrieved from http://www.icheck.com/ on Feb. 7, 2000, 7 pages.

Karpinski, R. "Web Merchants Try Debit Cards and Gift Certificates to Spur Sales" InternetWeek, Oct. 11, 1999, 2 pages.

Lawton, George; "Biometrics: A New Era in Security"; 1998, Computer, vol. 31, No. 8, pp. 16-18.

New commercial services from Western Union allow businesses to directly transfer money internationally; User companies can now send or receive money at their own offices through on-line connection to world's largest international money transfer network. Business Wire. Oct. 16, 1995, p. 1.

Russo, R. "Omaha's Giftpoint.com Draws $5 Million Investment", Omaha World, Dec. 14, 1999, 2 pages.

Stockel, Anna; "Securing Data and Financial Transactions"; 1995, Institute of Electrical and Electronics Engineers 29th Annual Conference, pp. 397-401.

PR Newswire, "GiftSpot.com Simplifies Gift-Giving on the Internet," Oct. 20, 1999 (abstract), [online] [retrieved on May 1, 2002], retrieved from Proquest Database, 5 pages.

TeleCheck International, Inc.: "Making Checks Our Responsibility", retrieved from http://www.telecheck.com/home/home.html on Feb. 7, 2000, 8 pages.

Transpoint, "The Way to Pay Online", downloaded from website http://www.transpoint.com/ on Feb. 10, 2000, 12 pages.

Walker, L. "Click a Card", The Washington Post, Dec. 16, 1999, 3 pages.

Website "eCount" at http://www.ecount.com.

Website: "Billpoint" at http://www.billpoint.com.

Website: "eMoneyMail" at http://www.emoneymail.com.

Website: "I-Escrow" http://www.iescrow.com.

Website: "PayMe.com" at http://www.payme.com.

Website: "PayMyBills.com" at http://www/paymybills.com.

Website: "PayPal" at http://www.paypal.com.

Website: "Tradesafe.com" at http://www.tradesafe.com.

Wijnen, Rene "You've Got Money!", Bank Technology News, New York, Jun. 2000, vol. 13, Issue 6, p. 1.

x.com, Do More with Your Money, downloaded from website http://www.x.com., Feb. 7, 2000, 5 pages.

http://news.firstdata.com/media/ReleaseDetail.cfm?ReleaseID=849995>.

Press Release: "Western Union Announces ATM Card Payout for Money Transfer Transactions"; 2001, URL: http://news.firstdata.com/media/ReleaseDetailcfm?ReleaseID=849995>.

Levin, Gary; "Western Union not fading into sunset; new services are added as telegrams drop"; 1992; 2 pages.

"Quick Collect"; Western Union Training Guide; 2004, 10 pages.

"Send your payment using Western Union Quick Collect"; 2 pages.

"Purchasing American Airlines Tickets Just Got Easier"; 2005, 4 pages.

"Lan Airline Alliance Carriers and Western Union Offer Travelers Additional Payment Options"; 2005, 3 pages.

Quick Collect: Governemt/Child Support Agency Name, Training Guide; 2004, 7 pages.

"Westerb Union Quick Collect; 3 Easy Ways to Send a Payment: In Person, Online or by Phone!"; 2 pages.

"Western Union: Now, using our service is even more rewarding"; 1 page.

"To send a Quick Collect Payment"; sample form, 1 page.

"Western Union: Some Quick Facts about Quick Collect"; 1 page.

"Quick Collect Sales Presentation"; 28 pages.

"Western Union Quick Collect"; 2 pages.

"Why Send Your Customers Across Town When You Can Send Them Next Door?"; 2005, 1 page.

"There's a lot to be said about the many advantages of the Quick Collect service. And look who's saying it."; 4 pages.

"If you're not getting your payment with Quick Collect, chances are you're not getting it"; 2001, 2 pages.

"Western Union: Ford Credit Phone Pay-How does it work?", 2001, 1 page.

Western Union Quick Collect: The Fastest way to collect good funds; 1999, 11 pages.

"Only Western Union"; 2 pages.

"Announcing Quick Collect Online"; 2002, Western Union's Professional Collector, 3 pages.

"When you're helping a customer make a crucial payment there's no room for guesswork"; 2002, Western Union's Professional Collector, 3 pages.

"Western Union Quick Collect: The most agents, the most locations, the most experienced"; 2000, 2 pages.

"It takes a certain person to make a good collector. But it takes a good manager to make a champion"; 2001, Western Union's Professional Collector, 3 pages.

"Nationwide Credit Collectors Act Globally"; 2001, Western Union's Professional Collector, 3 pages.

"Guess What? The check's not in the mail"; 2001, Western Union's Professional Collector, 3 pages.

"Quick Cash and Quick Collect: Western Union's money-movers"; 1990, *Newsbriefs*, vol. 2, No. 1, 3 pages.

Your sending more than a payment: Point-of-Sale & Merchandising Support Advertising Materials, 2 pages.

"Company Profile: The Western Union Convenience Pay Service"; 2004, 4 pages.

"Your sending more than a payment: You're sending peace of mind"; 2004, 3 pages.
"SBC Communications adds Western Union Locations for Walk-in Customer Bill Payments"; SBC News Release, 2 pages.
"Send Your Utility Bill Payment from Here!"; 4 pages.
"Rhode Island becomes first state to accept child support payments at Western Union: More than 50 Western Convenience Pay Agent Locations Offer New Level of Convenience to Rhode Island Residents Who Pay Child Support—"; 2002, 3 pages.
"Rhode Island becomes first state to accept child support payments at Western Union: Government Payment Leader govONE Solutions Adds Walk-in to Full Suite of Payment Options"; 2002, 3 pages.
"State of Hawaii to Accept Child Support Payments at Western Union"; 2004, 2 pages.
"Annual Report of the President of the Western Union Telegraph Company"; 1873, 11 pages.
"First located example of a money transfer"; Aug. 25, 1873, 2 pages.
"Annual Report of the President of the Western Union Telegraph Company"; 1874, 11 pages.
"The Western Union Telegraph Company: Rules for Money Transfer Service"; 1908, 25 pages.
"The Western Union Telegraph Company: Delivery Department Instructions"; 1926, Commercial Bulletin No. 9-A, 4 pages.
"The Western Union Telegraph Company:Instructions for Receiving Clerks"; 1929, Commerical Bulletin No. 37-A, 3 pages.
"Annual Report of the Western Union Telegraph Company"; 1935, 2 pages.
"Dots and Dashes"; 1935, vol. 11, No. 9, 4 pages.
"Annual Report of the Western Union Telegraph Company"; 1940, 3 pages.
"Annual Report of the Western Union Telegraph Company"; 1947, 3 pages.
"Annual Report of the Western Union Telegraph Company"; 1949, 3 pages.
"Annual Report of the Western Union Telegraph Company"; 1951, 5 pages.
"Annual Report of the Western Union Telegraph Company"; 1953, 2 pages.
"Annual Report of the Western Union Telegraph Company"; 1954, 3 pages.
"Annual Report of the Western Union Telegraph Company"; 1973, 5 pages.
"Annual Report of the Western Union Telegraph Company"; 1974, 9 pages.
"Annual Report of the Western Union Telegraph Company"; 1978, 2 pages.
"Annual Report of the Western Union Telegraph Company"; 1981, 2 pages.
"Amex Money Order Dispenser"; 1990, The Nilson Report, 1 page.
"Quick Cash and Quick Collect: Western Union's money-movers"; 1990, Newsbriefs, vol. 2, No. 1, 3 pages.
"Western Union's Would-Be Rival"; 1990, American Banker, 1 page.
"American Express in New Ad Drive"; 1990, American Banker, 1 page.
"American Express Unit Introduces State-Of-The-Art Automated Money Order Dispenser"; 1990, Tri-State Food News, 1 page.
"Annual Report of the Western Union Telegraph Company"; 1990, 4 pages.
"Collection by Money Transfer: MoneyGram Service Removes Time-Consuming Steps to Commercial Collections"; 1990, Collector, p. 36.
"Amex tests Moneygram"; 1990, Adnews, 1 page.
"Amex aims expansion strategy at local currency exchanges"; 1990, Crain's Chicago Business, 1 page.
"Sending Cash in a Flash"; 1990, Travel & Leisure, p. 42.
"... And a Nine-Second Money Order Dispenser"; 1991, Post-News, vol. 17, No. 1, 1 page.
"Money-wire giants battle for business: Currency exchanges wooed"; 1991, Chicago Sun Times, 2 pages.
"Sending Cash in a Flash: There are more ways to do it than you might think"; 1991, 2 pages.
"Loved one stranded? Send Cash"; 1991, Akron Beacon Journal, 2 pages.

"Common Values: Uncommon Opportunities"; 1995, First Data Corporation Annual Report, 2 pages.
"Behind the Scences of Life"; 1996, First Data Corporation Annual Report, 3 pages.
"First Data InfoSource Offers Database Analysis with DecisionScope"; 1996, First Data Corporation News Release, 2 pages.
First Data and Netscape Offering Internet Payment Processing Service; 1996, First Data Corporation News Release, 3 pages.
"CES/NaBANCO Introduces Stored Value Card Technology: Blockbuster Video is First Merchant Partner"; 1996, First Data Corporation News Release, 3 pages.
"First Data to Offer Card Profitability Software from HNC: Distribution Agreement Poised to Repeat Falcon Success";1996, HNC Software, Inc. News Release, 3 pages.
"VIPS Introduces MCSource to Managed Healthcare Industry"; 1996, VIPS Healthcare Information Systems News Release, 2 pages.
"Leading Provider of Transaction Card Processing Selects Connect Oneserver Software as a Solution for Advanced Internet Merchant Services: First Data Chooses OneServer as an Application to Deliver the Internet to Banks and Merchants"; 1996, press Release, 4 pages.
"Netscape Announces Netscape Livepayment to Facilitate Internet Commerce"; 1996, Netscape News Release, 4 pages.
"Strean, LittleNet, BBN, and KPMG Announce Industry-Wide Initiative to Enable Wide-Scale Software Electronic Commerce"; 1996, News Release, 6 pages.
"First Data and Netscape Announce Program to Help Businesses Establish Payment-Enabled Web Sites"; 1996, First Data Corporation News Release, 5 pages.
"FDR to Offer HNC Software's Real-Time Fraud Detection: New distribution Agreement to Benefit Card Banks"; 1996, First Data Resources News Releases, 2 pages.
"First Data Aligns with CyberCash to Offer New Electronic Coin Service"; 1996, First Data Corporation News Release, 3 pages.
"First Data, First USA Paymentech, GE Capital Invest in First Virtual Holdings"; 1996, First Virtual Holdings Corporation News Release, 3 pages.
"Annual Report of First Data Corporation"; 1998, 3 pages.
"Annual Report of First Data Corporation"; 1999, 2 pages.
"American Express Introduces Automated Money Order Dispenser"; 1991, Professional Check Casher, 1 page.
"Western Union Payment Services, Bidpay and Quick Collect, Online Bill Payment, Online Auction Payments"; http://www.westernunion.com/info/osComparePayment.asp, 2 pages.
"About Western Union: Company History"; http://www.payment-solutions.com/history.html, 2 pages.
"Western Union Money Transfer Services, Send Money Online, Money Orders, Send Telegrams"; http://www.westernunion.com/info/osCompareMoneyMessage.asp, 2 pages.
"Quick Pay: The Convenient and reliable way to receive payments from customers worldwide"; http://www.payment-solutions.com/quickpay.html, 3 pages.
Quick Cash: A safe and reliable way to send funds around the world; http://www.payment-solutions.com/quickcash.html, 1 page.
"Signature Services: Helping financial institutions send funds faster"; http://www.payment-solutions.com/signature.html, 1 page.
"American Express Money Orders, Travelers Cheques Now on Sale"; 1936, Dots and Dashes, 2 pages.
List of Prepaid Services; http://www.westerunion.com/info/osComparePrePaid.asp, 1 page.
"Get your Collect Card"; 1939, Dots and Dashes, 2 pages.
Picture of Bill payment form or advertisement, 1 page.
"NTS Completes Merger with EDS Fleet Services; New First Data Unit Sets Sights on New Markets"; 1996, NTS Press Release, 3 pages.
Transfers require ID made by telephaph; 1895, Tariff Book, 4 pages.
American Greeting Cards Click-Through; 38 pages.
"MoneyZap.com Greeting Card Process Flow"; 2000, 2 pages.
"Western Union/Money Zap: Send and receive money easily over the internet"; http://www.moneyzap.com/main.asp, 23 pages.
"Western Union Gift Greetings"; 6 pages.
"PayPal: The way to send and receive money online"; 4 pages.

"Aeromexico and Western Union Partner to Offer a Cash Payment Option for Booking Airline Tickets"; 2004, Press Release, 2 pages.
"Western Union and Continental Airlines Introduce New Quick and Easy Cash Payment Option When Booking Flights"; 2004, Press Release, 2 pages.
"Purchasing American Airlines Tickets Just Got Easier"; 2004, Press Release, 4 pages.
"LAN Airline Alliance Carriers and Western Union offer Travellers Additional Payment Options"; 2005, Press Release, 3 pages.
"Western Union Financial Services, Inc.: Benefits Quick Cash Agreement and Disclosure Statement"; 1998, 2 pages.
"Western Union Financial Services, Inc.: Cash Card Agreement and Disclosure Statement"; 1998, 2 pages.
"Federal Benefits Checks are Going Away-Don't Let Your Customers Go with Them: Announcing the Western Union Benefits Quick Cash Program"; 4 pages.
"Introducing the Western Union Cash Card Program"; 1998, 2 pages.
"Western Union Creates Phone Card with BLT Technologies"; 1997, PR Newswire Association, 2 pages.
"AT&T Wireless to Offer Western Union SwiftPay as Replenishment Option for AT&T Free2Go Wireless Prepaid Customers"; 2001, PR Newswire Association, 2 pages.
"New Western Union SwiftPay Service Continues Expansion of Consumer-to-Business Payment Options"; 1999, PR Newswire Association, 2 pages.
"Western Union SwiftPay Selected by Sheakley Uniservice to Complete W-2 Reprint Transactions"; 2000, PR Newswire Association, 2 pages.
"Rhode Island becomes First State to Accept Child Support Payments at Western Union: More that 50 Western Union Convenience Pay Agent Locations Offer New Level of Convenience to Rhode Island Residents Who Pay Child Support"; 2002, Press Release, 3 pages.
"Rhode Island becomes First State to Accept Child Support Payments at Western Union: Government Payment Leader govONE Solutions Adds Walk-in to Full Suite of Payment Options"; 2002, Press Release, 3 pages.
"SBC Communications Adds Western Union Locations for Walk-In Customer Bill Payments"; 2005, Press Release, 2 pages.
"Western Union Mony Orders More Popular Than Ever": 1942, Dots and Dashes, vol. 18, No. 3, 2 pages.
"Refund of Mony Transfers"; 1913, Journal of the Telegraph, 2 pages.
Western Union Credit Card; 1915, 4 pages.
How money by phone was paid;; Money Transfer Service: Book of Rules and List of Offices; 1926, Western Union Telegraph Company, 3 pages.
"Pilgrims Started Thanksgiving Custom"; Dots and Dashes, vol. 9, No. 11, 2 pages.
"The Yellow Blank is Correct for every social need"; 1930, Western Union Booklet, 2 pages.
"Last of the Pony Express Riders Tells His Story"; 1932, Dots and Dashes, vol. 8, No. 10, 2 pages.
"Nation Receives Time Over Western Union Network"; 1931, Dots and Dashes, vol. 7, No. 5, 2 pages.
"Collect your delinquent accounts by Telegraph"; 1933, Form 1229-A, 1 page.
"Reynolds Arcade was Western Union Birthplace"; 1933, Dots and Dashes, vol. 9, No. 8, 2 pages.
"Messenger Work Full of Adventure, Excitement"; 1933, Dots and Dashes, vol. 9, No. 11, 2 pages.
Shopping Order service and gift service; 1934; Western Union Telegraph Company, Money Order Book, 6 pages.
Money Orders by Phone; 1935, Fortune Magazine, 3 pages.
"The Yellow Blank: When, Why, How to Use It"; 1934, 5 pages.
Money Order with confirmation; 1948, 1 page.
"Western Union Products and Services: a brief description"; 1960, 21 pages.
Survey of services; 1960, 15 pages.
Western Union News Supplement: Automatic travelers checks using Western Union; 1975, 2 pages.
Western Union New Supplement: Money Orders delivery through Mailgram: 1975, 2 pages.
Candygram payment service, 1 page.
Remittance for order sent via Western Union; 1933, 2 pages.
Western Union Telegraph Company; 1933, Money Order Message.
Gift: Money Order for something you really want: 1933, 1 page.
Holiday Greeting by Western Union; 1933, 1 page.
Western Union Money Transfer, Form 72-A, 1933, 1 page.
Western Union Foreign Transfer Order, Form 72-A, 1933, 1 page.
Western Union Domestic Transfer Order, Form 72-A, 1933, 1 page.
Western Union Gift Orders: A Practical Answer to the Christmas Gift Problem, 1933, 1 page.
Western Union Gift Orders: The Sensible, Convenient Way to take care of your Christmas Shopping; 1933, 1 page.
Shopping Order by Western Union, 1933, 1 page.
Western Union Shopping Order, 1933, 2 pages.
Western Union Hotel-Motel Reservation Service, 1 page.
bidpay.com: Whois search results; 2003, http://www.networksolutions.com/en_US/whois/results.jhtml;jsessionid+VZDZVYDD1J, 2 pages.
"billserv.com Launches bills.com, as internet Portal for Consumers to Pay All Bills Online at No Cost"; 2000, Business Wire, 1 page.
First Data Acquires PaySys International; 2001, Press Release, 2 pages.
Luxury Brands LLC: WOrld Famous Brands at Liquidation Proces; http://www.auctionbytes.com/cab/pages/payment, 3 pages.
PayPal for the Palm; http://handheldnews.com/file.asp?ObjectID=5401, 2 pages.
PayPal.com Case Study; http://fox.rollins.edu/~slackman/PayPal.htm, 2003, 7 pages.
PayPal-News; http://www.ndrys.com/paypal.html, 2003, 3 pages.
Hoffman, Karen Epper; "PayPal Still Running Free"; 2003, Bank Technology News, 3 pages.
Latour, Almar; "PayPal Electronic Plan May be on the Money in Years to Come"; 1999, The Wall Street Journal, 2 pages.
Plotkin, Hal; "Beam Me up Some Cash"; 1999, Silicon Valley Insider, 3 pages.
Boneh, Dan: "Beaming Money by Email is Web's Next Killer App"; 1999, PR Newswire, 4 pages.
BidPay: Seller FAQs—Receiving Payments and Using the Money Order Service; 7 pages.
BidPay: Buyer FAQs—Receiving Payments and Using the Money Order Service; 7 pages.
Steiner, Ina: "BidPay.com Offers Click and Pay Service for buyers"; 2000, Auction Bytes, 4 pages.
Steiner, Ina: "Follow-up to BidPay Article"; 2000, Auction Bytes, 3 pages.
Steiner, Ina: "PayPal Online Payment Service—Another Way to Pay for Auction Items"; 2000, Auction Bytes, 4 pages.
Steiner, Ina: "Accepting Credit Cards When You Sell Items: ProPay and Billpoint Payment Services"; 2000 Auction Bytes, 4 pages.
Wermer, Sandra; "A million credit card transactions in five hours"; 1997, Primeur, 2 pages.
"PaySys signs up four Asian distributors"; 1997 Orlando Business Journal, 3 pages.
Products and Services for PaySys, 2 pages.
VisionPLUS Consumer Payment Solution Overview, 2 pages.
PaySys—company overview, 2 pages.
State of New York Banking Department: Staff Letters and Memoranda; 2000, http://www.banking.state.ny.us/lo000718.htm, 2 pages.
Wijnen, Rene; You've Got Money!; 2000, Bank Technology News, vol. 13, No. 6, 4 pages.
Author unknown "Online Payment Services" www.auctionbytes.com/cab/pages/payment, compiled Nov. 2002, 3 pages.
Author Unknown, "About Western Union", www.westernunion.com, Jun. 10, 2003, 9 pages, found on www.westernunion.com/info/aboutUsIndex.asp?country=global internet website and printed on Jun. 10, 2003.
Author Unknown, "BidPay: Buyer FAQs—Receiving Payments and Using the Money Order Service"; date unknown; found on www.bidpay.com website, 7 pages.
Bowen, Cathy, "Behind the Spree in Payments for C2C", Credit Card Management, New York: Apr. 2000, vol. 13, Issue 1, p. 28, 8 pages.

Card News; "Now E-Mail Payments from Your Palm Pilot", Dec. 1, 1999; v14, n23, p. 1.

Gardyne, Allan, "Introducing Paypal: Paypal—the electronic money transfer system"; Dec. 9, 1999; http://www.associateprograms.com/articles/385/1/Introducing-PayPal; pp. 1-3.

Large, Jack, "Connect Now With Electronic Commerce," Corporate Finance, London, Jul. 1998, Issue 164.

Radecki, Lawrence et al., "Paying Electronic Bills Electronically,". Current Issues in Economics and Finance. vol. 5, No. 1, Jan. 1999.

Weitzman, Jennifer, "Star Trek Promise Fulfilled: Wireless Cash Transfer. (Confinity, Inc.'s PayPal.com service)", Dec. 9, 1999, American Banker, V164, n235, pp. 1-2.

* cited by examiner

AUTOMATED GROUP PAYMENT

This application claims the benefit of both PCT Patent Application No. PCT/US01/22,179 filed on Jul. 11, 2001 and U.S. patent application Ser. No. 09/613,615 filed on Jul. 11, 2000.

BACKGROUND OF THE INVENTION

The invention relates generally to stored value fund transactions, and more particularly relates to transferring money between parties with a network-accessible stored value fund.

One party may wish to transfer money to herself, a counter party, or vice versa, for any of a variety of reasons. Frequently, a payor party owes a debt to a payee party. The debt may be an informal IOU or a more formal transaction. Other times, the payor may wish to give the money to the payee as a gift. For example, the payee may have sold an auction item to the payor.

Until recently, payors typically complete such payments via cash, check or money order because the payee does not have the ability to receive money electronically. Electronic payment methods exist, such as credit cards and bank account debits through electronic fund transactions, however, the payor may not have access to these methods for whatever reason. For example, these electronic payment methods may require purchasing hardware and/or software to support accepting payment. Configuration, maintenance, and training for these electronic payment methods are costly and time consuming.

BRIEF DESCRIPTION OF THE DRAWINGS

The present invention is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

The present invention facilitates online money transfers between a payor and a number of payees. By accessing an online payment enabler through the Internet or other wide area network, users can transfer money. The money is paid in or out through money handlers such as credit/debit cards, banks, promotion programs, and agent locations. The ability for a payor to transfer money to a large number of payees in a single transaction, in this embodiment, greatly simplifies payment distribution.

Money is transferred between users of the online money transfer system. Money is a credit amount stored as a database entry corresponding to the user. The database entry corresponds to a stored value fund for that user that can be supplemented by transferring-in credit or reduced by transferring-out credit. The money or credit is transferred between users by updating the database entries for the users involved in the transfer. Money could be in any currency or be anything of monetary value, for example, airline mileage, promotional program points, gift certificate credit, commodities such as gold, etc.

Figure 1:
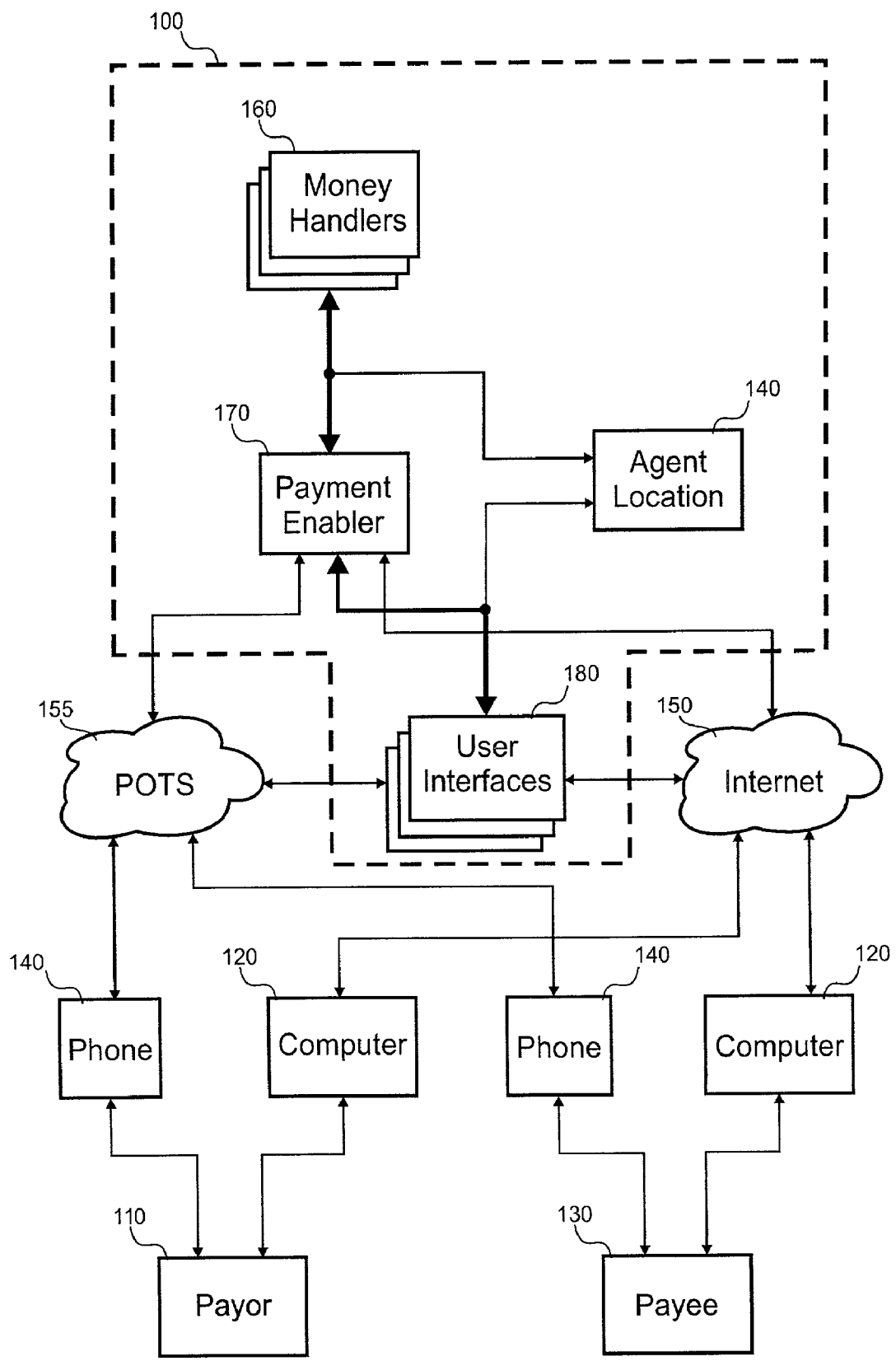
FIG. 1 is a block diagram of an embodiment of an online money transfer system that is interfaced to a payor and payee.

Referring initially to FIG. 1, a block diagram of an embodiment of an online money transfer system 100 is shown interfaced to a payor 110 and payee 130 by way of the Internet 150 or a plain old phone system (POTS) 155. Although this embodiment shows users 100, 130 interfaced through the Internet 150 or the POTS 155, any other wide area network technology could be used. This embodiment demonstrates some interfaces to the payment enabler 170, but other interface arrangements are possible. The money transfer system 100 includes a payment enabler 170, a number of user interfaces 180 and a number of money handlers 160.

The payment enabler 170 controls the flow of credits throughout the system 100. Credit is received by the payment enabler 170 from the money handlers 160 where a payor or sender 110 transfers the credit to a payee or receiver 130. The credit is transferred by the payee 130 to a selected money handler 160. Presumably, the payee 130 can retrieve and use the credit after it is transferred to the money handler 160.

Users 110, 130 and/or agents interact with the payment enabler 170 through user interfaces 180. These interfaces 180 are designed to couple different front ends to the payment enabler 170. In the depicted embodiment, there are three types of user interfaces 180. One interface supports Internet 150 connections to the payment enabler 170. Any number of devices could communicate by way of the Internet 150, but this embodiment uses computers 120 associated with the payor 110 and payee 130 to interact with the payment enabler 170. Another user interface 180 allows communication with telephones 140 over the POTS network 140. Yet another interface allows an agent location 125 to communicate with the payment enabler. The agent could add and remove money from the payment enabler 170 under the direction of a payor 120 or payee 130.

The money handlers 160 are typically organizations that are used to pay for items or to store money, but often are difficult for the payor or payee 110, 130 to use when making payments. Examples of money handlers 160 include credit/debit cards, banks, promotion programs, and agent locations 125. In this embodiment, the agent location 125 serves as an interface to the payment enabler 170 as well as a money handler 160. Handlers 160 have established mechanisms for moving money that payors 110 and payees 130 are accustomed to using, such as, paying for items with a credit card and withdrawing money from a bank. However, payors 110 and payees 130 may have no way to accept credit cards or wire transfers.

Figure 2:
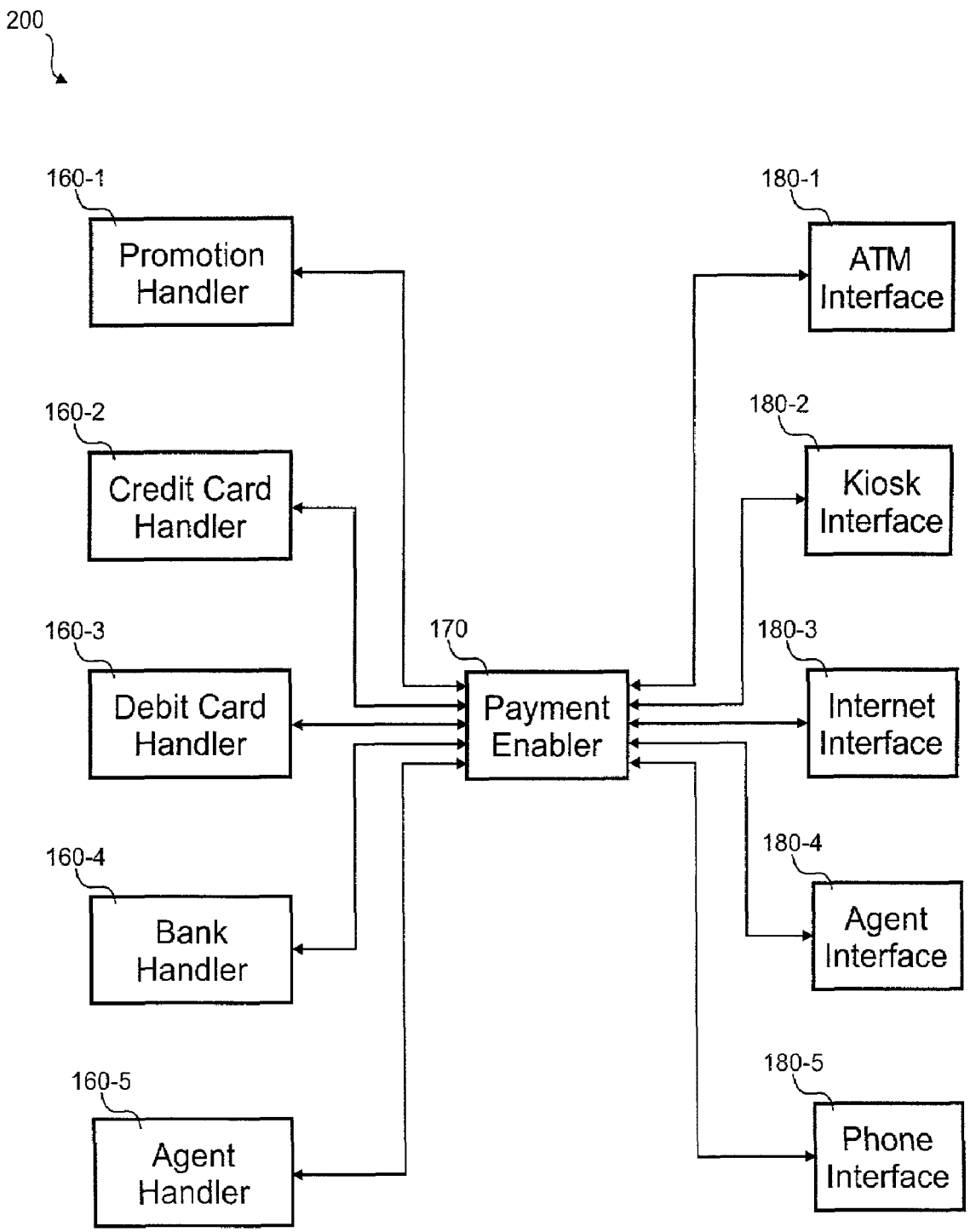
FIG. 2 is a block diagram of another embodiment of an online money transfer system.

With reference to FIG. 2, a block diagram of another embodiment of an online money transfer system 200 is shown without the payors 110 or payees 130. In this embodiment, five handlers 160 and five user interfaces 180 are shown. Other embodiments could have more or less handlers 160 and interfaces 180. Each of the handlers 160 allows a user to add and/or remove money from the payment enabler 170. Normally, the payee 130 can choose the handler 160, but in some circumstances, the payor 110 can choose the handler 160. The user interfaces 180 allow interaction with the payment enabler 170 to transfer funds.

The promotion handler 160-1 allows adding and removing money in a form other than legal tender or negotiable instrument. Examples include airline mileage programs and gift certificate programs. For example, a user could use money in their stored value fund to purchase airline miles with an airline mileage handler 160-1. A conversion rate would be applied to convert the money to mileage credit. The promotion handler 160-1 may need special information from the payment enabler 170, such as the user's promotion account number or type of gift certificate.

The credit and debit card handlers 160-2, 160-3 behave largely the same. Both can be used to add money into the payment enabler 170. In other embodiments, these handlers 160-2, 160-3 can also be used to remove money from the payment enabler 170 also. To use these handlers 160-2, 160-3, the payment enabler 170 stores the information for receiving money from credit or debit cards in the conventional way, such as the account number, expiration date, name, and/or PIN.

The bank handler 160-4 allows electronic funds transfer (EFT) of money to a bank account of the user. The user enters the account number and routing information into the payment enabler 170 with a user interface 180 to facilitate adding and removing of money from the payment enabler with this handler 160-4. In one embodiment, an automated teller machine (ATM) could incorporate the bank handler 160-4 along with an ATM interface 180-1 to allow adding and removing funds along with interfacing with the payment enabler 170. Another embodiment uses a bank handler 160-4 branch location as an agent interface 180-4 for interacting with the payment enabler 170.

The agent handler 160-5 typically corresponds to an agent location 125 that may wire money, print money orders and/or cash checks. Money may be sent to the agent handler 160-5, whereafter the user receives cash or a negotiable instrument for that money. Money can be added to the system 100 by the agent handler also. For example, the user may give cash to the agent who enters a credit into the payment enabler. The user could further specify to the agent a payee to receive the money. An agent interface 180-4 at the agent location 125 is used by the agent to indicate to the payment enabler 170 that the money has been received from or by the user. Through an agent handler 1605 a user could use the online money transfer system 100 without any knowledge of computers or any debit/credit card or bank account.

As briefly discussed above, the ATM interface 180-1 allows interaction with the payment enabler 170. The user may or may not have an affiliation with the ATM that is used to interface with the payment enabler 170. Under this circumstance, the owner of the ATM may charge the user a fee for this service. The user can receive cash or deposit cash if the ATM is coupled to a bank handler 160-4. In any event, the ATM interface 180-1 can be used to interface with the payment enabler 170 in the same way a user may interact through a web browser with the payment enabler 170. If the ATM has a magnetic stripe or smart card reader, this could be used by to avoid entering credit or debit card information manually for the payment enabler 170.

A kiosk interface 180-2 allows a user to interact with the payment enabler, but typically does not allow adding or removing cash. The kiosk interface 180-2 may be a browser terminal available for general use. Some embodiments may include a check or money order printer for removing money from the system 100. The kiosk interface 180-2 could be in an agent location 125 and linked to the other systems in the agent location 125.

An Internet interface 180-3 is typically implemented through a web browser. The browser downloads web pages from the payment enabler 170. The Internet interface could be hosted by the computer 120 of the user. Some embodiments could host the Internet interface on a portable device such as a wireless phone or personal digital assistant (PDA). The Internet interface 180-3 may also be used by the ATM, kiosk and agent interfaces 180-1, 180-2, 180-4 in whole or in part. The Internet interface 180-3 uses encryption for the link to the payment enabler 170 in some embodiments.

The agent interface 180-4 allows for specialized interaction by an agent at the agent location 125. Agents typically have special training and offer enhanced services over most interfaces 180 and handlers 160. The agent can move money between payors 110 and payees 130 at the direction of the user. Also, the agent can pay-in and pay-out money from the transfer system 100. The agent interface 180-4 allows an agent to act on behalf of the user when manipulating the user's account. For security, the user's password or PIN may be entered during this manipulation.

Interaction with the payment enabler 170 may also be performed over a telephone 140 interfaced to the POTS 155. The phone interface 180-5 provides voice prompts and recognizes the user's touch-tone or speech recognized input. Enhanced interaction with the phone interface 180-5 could be provided with wireless phones having wireless access protocol (WAP) or browser graphical user interfaces (GUIs).

Figure 3:
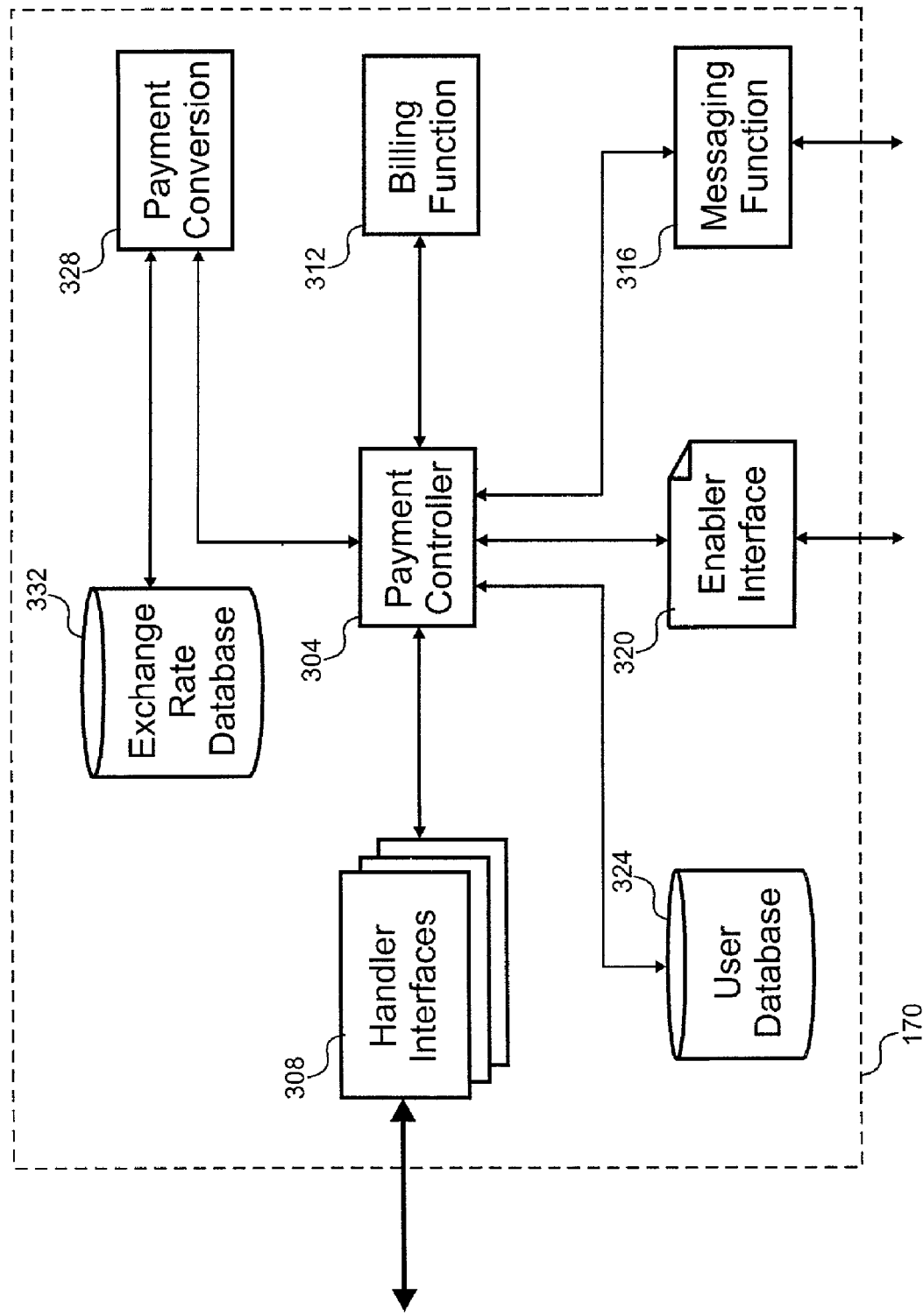
FIG. 3 is a block diagram of an embodiment of a payment enabler.

Referring next to FIG. 3, a block diagram of an embodiment of a payment enabler 170 is shown. The transfer of money between handlers 160, stored value funds and users 110, 130 is controlled by the payment enabler 170. The payment enabler 170 may be implemented on one or more computers in one or more locations where the various computers communicate over a network. Included in the payment enabler 170 are a payment controller 304, handler interfaces 308, a billing function 312, a messaging function 316, an enabler interface 320, a user database 324, a payment conversion function 328, and an exchange rate database 332.

The payment controller 304 manages operation of the payment enabler 170. The handlers 160 and interfaces 180 along with user information and money conversion tasks are all choreographed by the payment controller 304. The payment controller 304 is interconnected to the other portions of the payment enabler 170 by one or more networks.

The payment conversion function 328 allows converting between disparate forms of money as it is transferred through the system 100. An exchange rate database 332 holds conversion factors that allow determining the proper weight to give one form of money. In a simple example, the payment conversion function 328 may convert money in U.S. dollars to money in European Union Euros. In another example, a user may convert money into airline miles of eight miles for every dollar for a promotion handler 160-1. The exchange rate database 332 is updated with conversion rates as often as practical using conventional methods. The conversion rate may accommodate a percentage service fee for the exchange or a flat fee could be charged.

A billing function 312 monitors and charges for the services of the payment enabler 170. There may be charges when transferring money, converting money, printing and mailing negotiable instruments, using kiosks, ATMs or agent locations, etc. These charges are normally deducted from a transfer, but other embodiments could charge monthly fees. The different types of handlers 160 may have different fees associated with them. For example, a credit card may have a three percent charge, but a bank transfer may only have a one percent charge. The payor and/or the payee can be charged to transfer money between themselves. The transfer in or out of the system 100 may incur a separate charge. The billing function 312 may issue invoices for some users.

There are handler interfaces 308 to support the handlers 160. Each of these interfaces 308 may support a single handler 160 or a group of handlers. For example, a single interface may perform EFT to and from bank handlers 160. When money is sent to or received from a handler 160, the appropriate handler interface passes the money and transfer information to the payment controller. In some embodiments, the cost of the transfer to or from the handler is reported by the handler interface 308 such that the billing function can recover those costs.

Information for the users of the system 100 is stored in the user database 324. This information includes an address book of other users, money credit in the stored value fund, past money transfer information, account number, e-mail addresses, contact information, handler interface information, handler preference information, etc. The money credit is stored in a trust account for the benefit of the user according to the entry in the user database 324 corresponding to that user and interest may or may not be paid on that money credit.

The enabler interface 320 is used by the various interfaces 180 to interact with the user. The enabler interface 320 produces the form web pages and informational web pages to allow the user to create and maintain their account, transfer money and learn to use the system 100. The appropriate user interface 180 formats and processes the enabler interface information according to the device used to interface with the payment enabler 170. For example, the Internet interface 180-3 takes the information from the enabler interface 320 and formats into hypertext mark-up language (HTML) appropriate for the computer 120 of the user.

A messaging function 316 is used with some configurations to notify the user of certain events. Requests for money are sent by the messaging function 316 along with acknowledgment and billing messages. These messages could be accessed using a web browser, an e-mail program, an instant messaging program, a pager, a WAP enabled device, etc. In some embodiments, the messaging function 316 may issue printed bills for users. The messaging function 316 is also used to communicate with agent locations 125.

Figure 4:
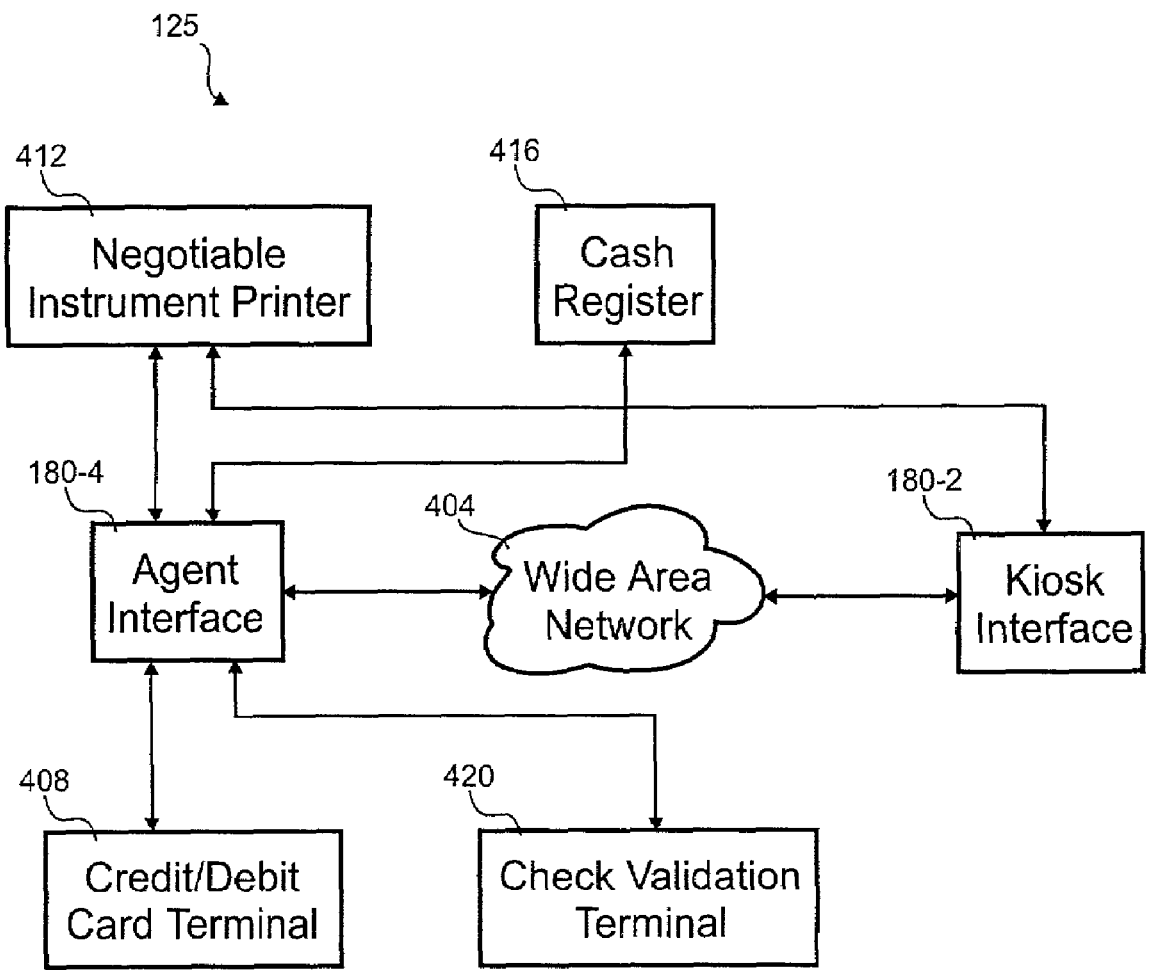
FIG. 4 is a block diagram of an embodiment of an agent location that includes an agent interface and kiosk interface.

With reference to FIG. 4, a block diagram of an embodiment of an agent location 125 is shown that includes an agent interface 180-4 and kiosk interface 180-2. Both interfaces 180-2, 180-4 are coupled to a wide area network 404 that is coupled to the payment enabler 170.

The kiosk interface 180-2 is primarily intended for users to interact with, and the agent interface 180-4 is primarily intended for agents to interact with. In some embodiments, both interfaces 180-2, 180-4 are used to perform a transfer. For example, the agent may use the agent interface 180-4 to perform the transfer while the kiosk interface 180-2 is used to monitor the agent's actions and enter a password or PIN that is kept secret from the agent. The kiosk interface 180-2 may also be used to perform a complete transfer in circumstances where the user is trained to use the system 100, but does not utilize other interfaces 180 for whatever reason.

The agent interface 180-4 and kiosk interface 180-2 can output a negotiable instrument with a printer 412. Examples of negotiable instruments include money orders, cashiers checks, tellers checks, certified checks, checks, gift certificates, coupons, etc. In some embodiments, each interface 180-2, 180-4 may have a separate printer. The printer 412 may also be used to print receipts and messages related to the transfer of money.

Money can be added to or removed from the system 100 at the agent location 125 with money distribution devices 408, 416, 420. In the conventional manner, cash can be received by the cash register, credit or debit cards and be debited by the card terminal 408, and checks can be confirmed with a check validation terminal 420. Cash can be paid out from the cash register 416 or added to a credit or debit card by the card terminal 408 in a conventional fashion. These money distribution devices 408, 416, 420 all interface with the system 100 by way of the agent interface 180-4 such that pay-outs and pay-ins can be automatically recorded by the payment enabler 170.

Figure 5A:
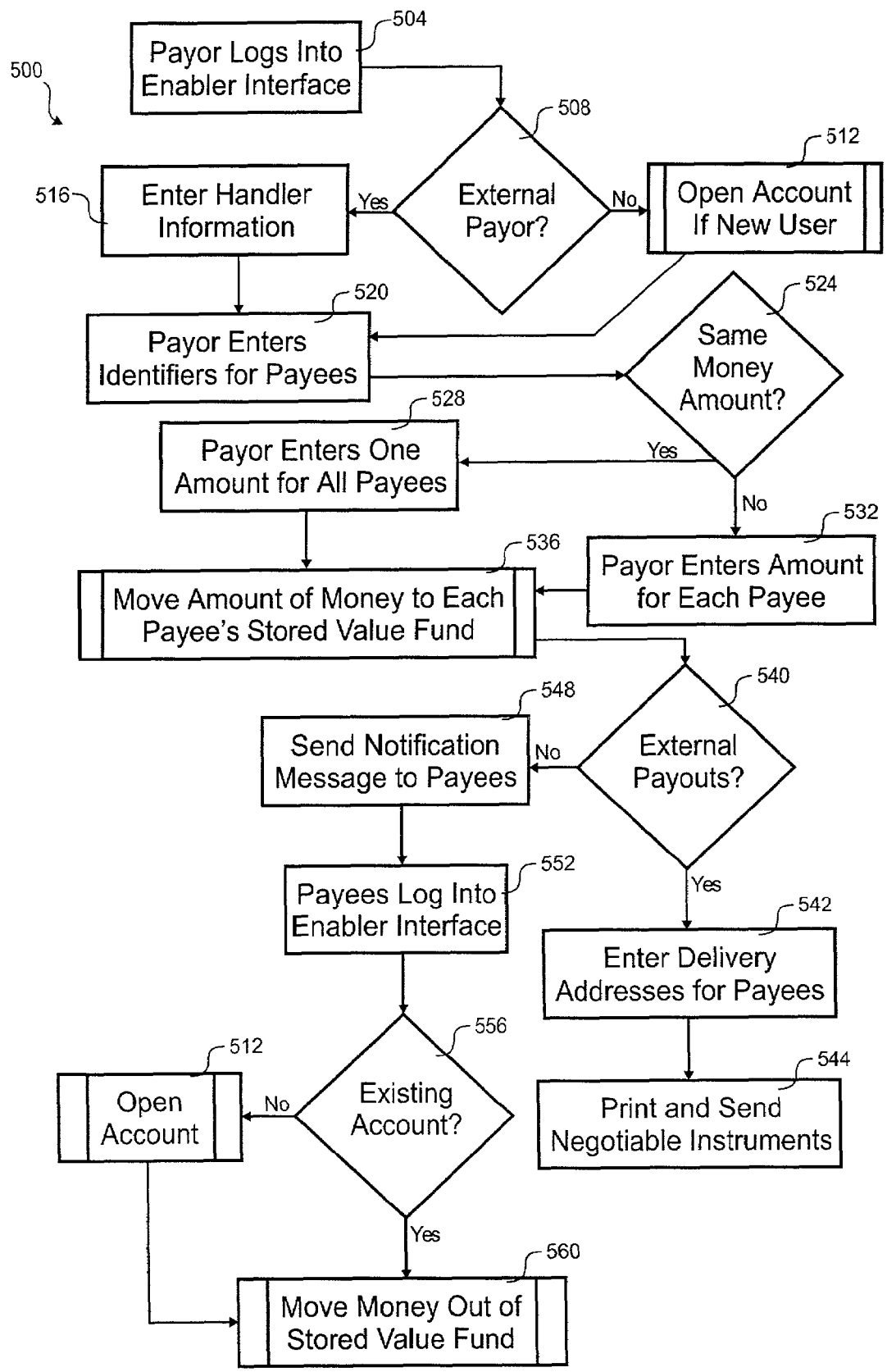
FIG. 5A is a flow diagram of an embodiment of a process for transferring money to a number of payees.

Referring next to FIG. 5A, a flow diagram of an embodiment of a process 500 for transferring money to a number of payees 130 is shown. In this embodiment, any number of payees 130 can receive money from a payor 110. The amount sent to each payee 130 can be the same or different. The target for the transfer can be a stored value fund or an external payout that goes strait to a handler 180 that prints a negotiable instrument for mailing or pick-up by the payee.

The depicted portion of the process begins in step 504 where the payor 110 logs in to the system 100 through the enabler interface 320 by way of the Internet interface 180-3. Under some circumstances, the payor 110 can avoid creating an account with the payment enabler 170 by acting as an external payor 110 in step 508. Avoiding account creation reduces the amount of information the payor 110 enters. Handler information for this external payor transfer is entered in step 516 and only used for this transfer and discarded when done. Some embodiments, may retain the handler information in case the payor 110 ever logs back into the system 100. If the payor 110 does not remain external to the system 100, an account is opened in step 512 when there is no existing account.

Regardless of whether the payor 110 is external to the system 100, the payor 110 enters the unique identifiers for the payees 130 in step 520. The unique identifiers in this embodiment are e-mail addresses of the payees 130, but could be any existing or new code that uniquely identifies the payee in other embodiments. Some embodiments may include an address book stored either locally or remotely with the payment enabler 170. The address book could include in a list the unique identifier for a single user or a group that includes the unique identifiers for the group of users. By selecting the group, all the included users become payees for the transfer. The group can further include the amount transferred last time to the users such that the amounts can be reused if they are the same for the new transfer.

In step 524, it is determined if the payor 110 wishes to send an equal amount of money to each payee 130 of the money transfer. The payor 110 either enters the one amount for all payees 130 in step 528 or enters a unique amount for each payee 130 in step 532. In any event, processing from steps 528 and 532 proceeds to step 536 where the specified money amount is transferred into each payees 130 stored value fund. At this point, the payment controller 304 communicates with the handler interface 308 to receive the money into the system 100. The allocated amount is recorded into the user database for each payee 130, but the aggregate money is stored in a trust account.

In step 540, a determination is made as to whether the payout should be external to the system 100. Where an external payout is performed, the stored value find used in step 536 can be a temporary fund that can be removed from the system after the payee 130 receives the money. In step 542, the payor 110 enters a delivery address for the payee 130. A message is sent to an agent location 125 with a negotiable instrument printer 412 that indicates a payee name, an amount and a delivery address. In step 544, the money order or other negotiable instrument is printed and sent to the address of the payee 130. Regular mail or courier services could be used to delivery the negotiable instrument.

Where an external payout is not selected in step 540, processing continues to step 548. In that step, a message is sent to the payees notifying them of the available money. This message may include instructions for new users to create an account. If the user has an existing account, the message could indicate the total cash in the account and/or promotional information. In step 552, the payees 130 log into the enabler interface 320.

A determination is made in step 556 as to whether each payee 130 has an existing account. Where there is no account, one is opened by the payee 130 in step 512. Once the payee 130 has an account, processing proceeds to step 560 where the payee 130 can move money out of her stored value fund.

In this embodiment, the payor can choose an external payout in step 540 such that the payee 130 need not have an account with the system 100. Other embodiments, could market a separate product where there is no option to send money to a permanent stored value fund of the payee 130 such that all payees 130 are external to the system and all payees 130 need not have an account with the system 100. In another embodiment, money could be transferred by the system 100 between the pay-in handler 160 and the pay-out handler 160 without a need for the payor 110 or payee 130 having a stored value fund to temporarily store the money. The pay-out handler 160-5 could be an agent location 125 that prints and sends a negotiable instrument after receiving the money directly from the payor's pay-in handler 160 under the direction of the payment enabler 170.

Figure 5B:
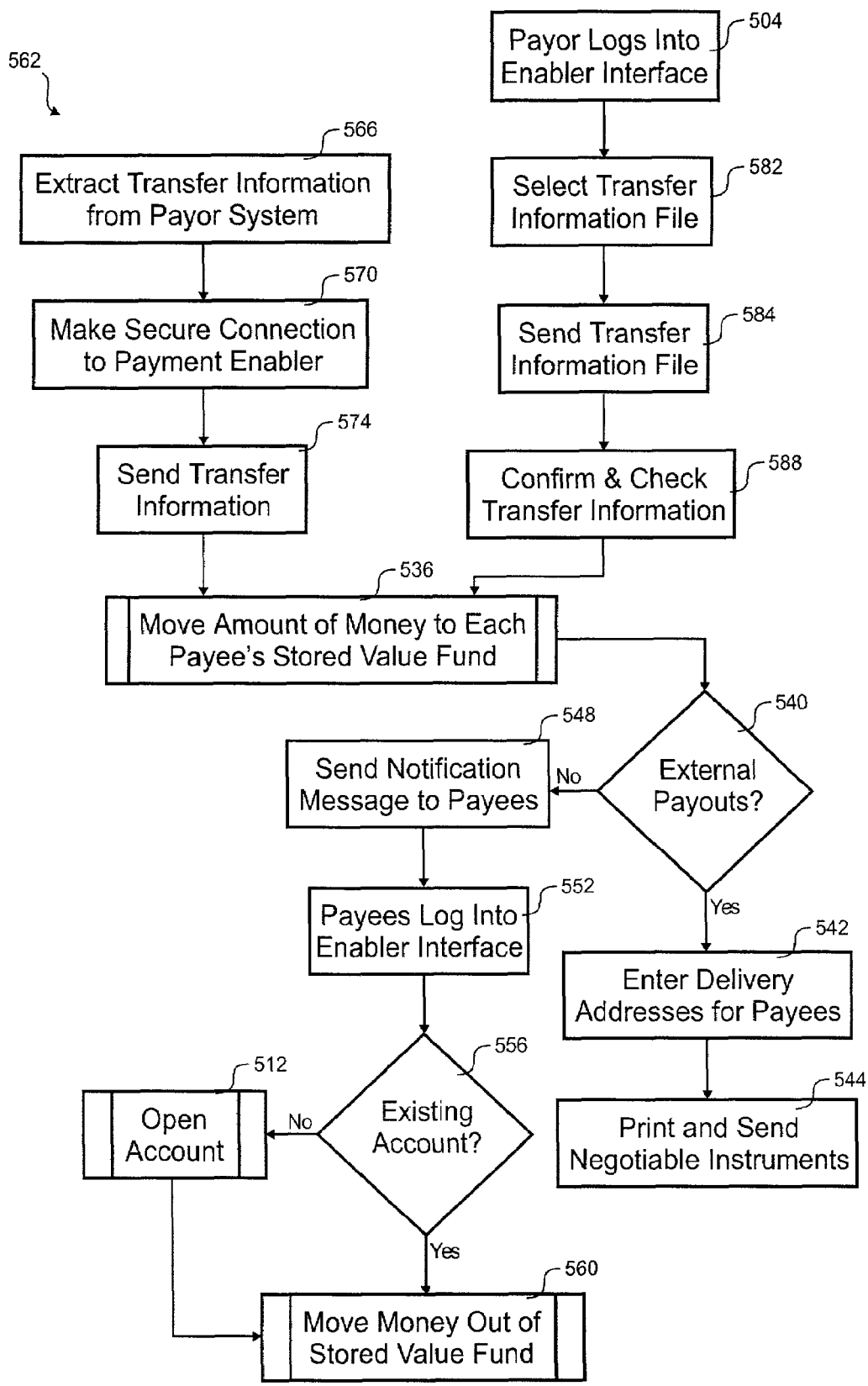
FIG. 5B is a flow diagram of another embodiment of the process for transferring money to a number of payees that automates entry of transfer information.

With reference to FIG. 5B, a flow diagram of another embodiment of the process 562 for transferring money to a number of payees 130 is shown that automates entry of transfer information. The transfer information includes for each payee: the payee name, unique identifier or e-mail address, money amount, and message body and title. A format such as extensible markup language (XML) or other conventional format can be used for this transfer inforamation. This embodiment allows automatically sending a file with transfer information or manually indicating the file. Other embodiments could allow cutting and pasting the transfer information.

Where automatic sending of the transfer information is used, processing begins in step 566 where the transfer information is formulated by a payor computer system. For example, the payor computer may process holiday bonuses for employees. To pay the holiday bonuses, the payor computer could produce an XML file with the transfer information that is sent to the payment enabler 170 for distribution to the employees. In step 570, a secure connection is made between the payor computer and the payment enabler 170 using, for example, a secure sockets layer (SSL) session. Once a secure link is established, the file with the transfer information is sent in step 574.

In some circumstances, the payor 110 may manually specify a file that contains the transfer information. This alternative scenario begins in step 504 where the payor 110 logs into her account by way of the enabler interface 320. In step 582, the transfer information file is selected by the payor 110 specifying the URL or volume, path and file name. In step 584, the payor 110 begins the upload of the file using a secure connection such as SSL. A web page showing the transfer information is presented to the payor 110 in step 588 to allow verification of the information. Once the transfer information file is received, processing continues to step 536 in the same manner as that described in relation to FIG. 5A above.

Figure 6A:
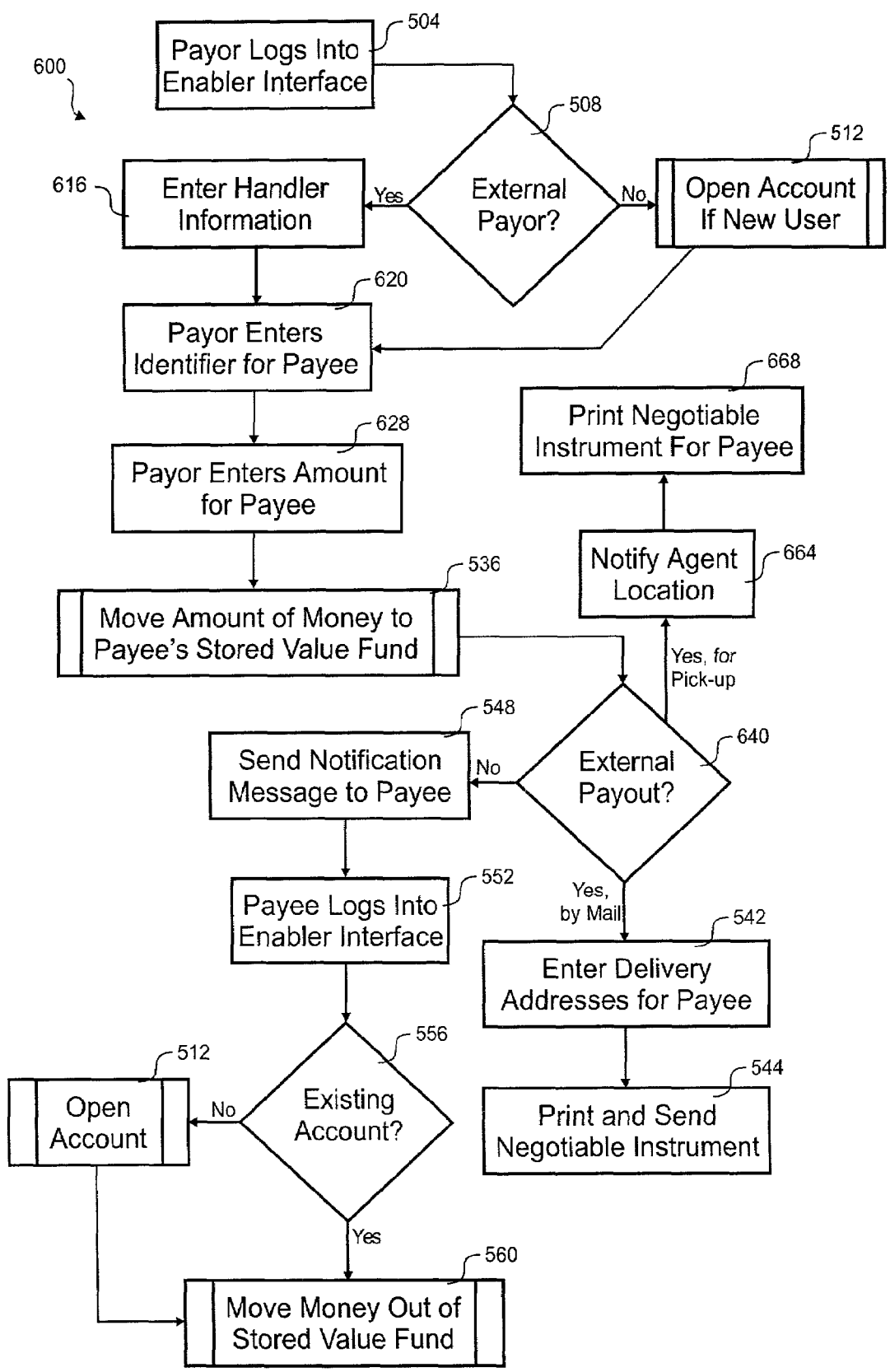
FIG. 6A is a flow diagram of an embodiment of a process for transferring money that could include the payee receiving a negotiable instrument.

Referring next FIG. 6A, a flow diagram of an embodiment of a process 600 for transferring money that could include the payee 130 receiving a negotiable instrument is shown. In this embodiment, a single transfer occurs between a payor 110 and a payee 130. For the external payout, the negotiable instrument can be mailed or held at the agent location 125 for pickup. Other embodiments could have multiple payees 130 where the negotiable instruments are optionally held at an agent location 125 for pickup.

This process 600 begins to notably differ from the embodiment of FIG. 5A in step 620 where a single identifier for a single payee 130 is entered. Continuing on to step 628, the payor 110 enters the transfer amount for the payee 130. The payment enabler 170 in step 536 gathers the money from the default handler 160 previously indicated by the payor 110. In step 640 the type of payout is chosen from: a payout to a stored value fund, an external payout that is sent to the payee location, or an external payout that is made available for pickup. The latter two options are described in relation to FIG. 5A.

Where the external payout for pickup option is desired, processing continues to step 664 from step 640. Where an external payout is performed, the stored value fund used in step 536 can be a temporary fund that can be removed from the system after the payee 130 receives the money. In step 664, a message is made available to all agent locations 125 with a negotiable instrument printer 412 that indicates a payee name and an amount. When the payee 130 arrives at a chosen agent location 125, the agent can use the agent interface 180-4 to the payment enabler to verify the payee 130 is due payment. After verification of the identity, the negotiable instrument is printed for the payee 130 in step 668.

Figure 6B:
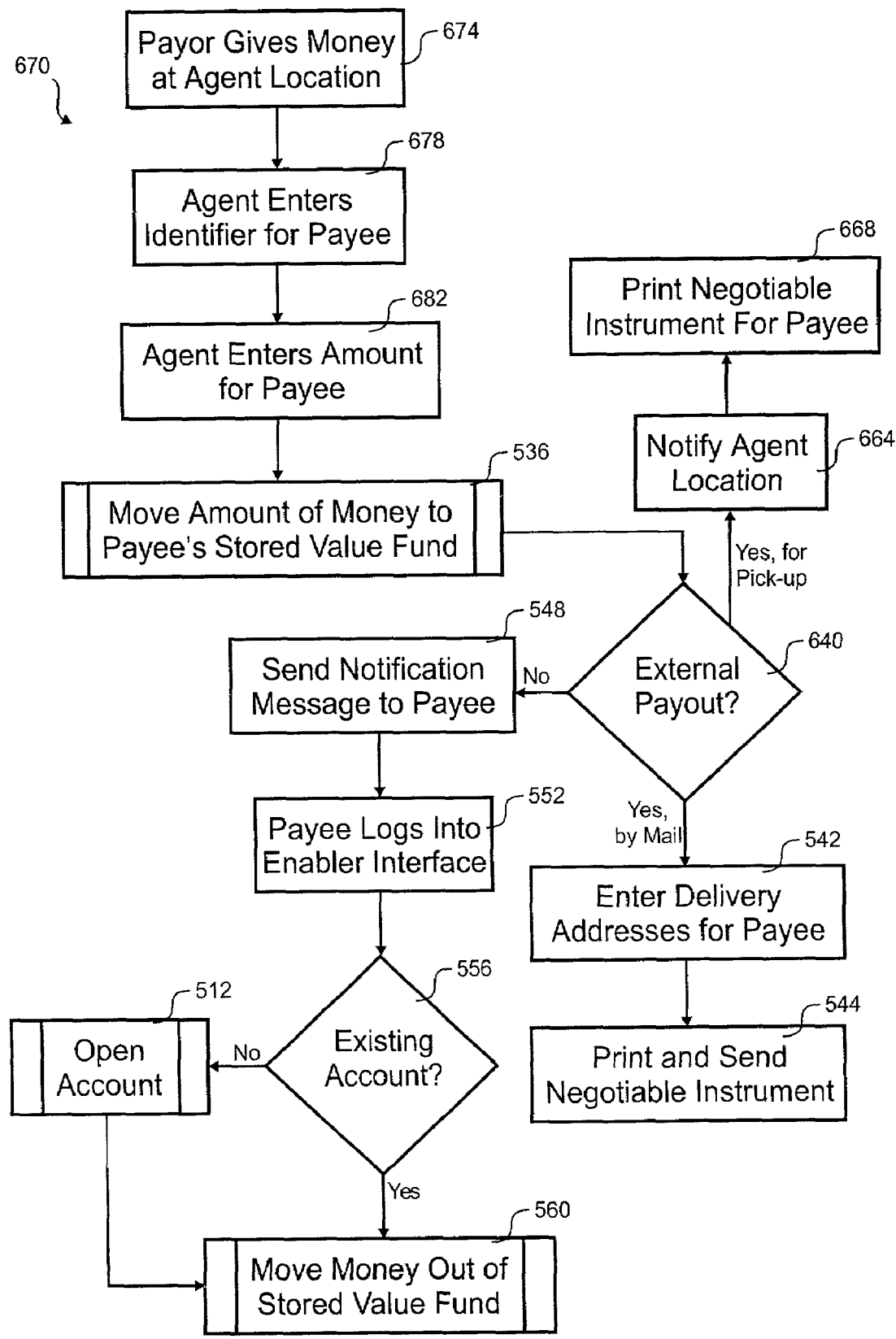
FIG. 6B is a flow diagram of another embodiment of the process for transferring money with the negotiable instrument where the payor uses an agent location.

With reference to FIG. 6B, a flow diagram of another embodiment of the process 670 for transferring money with the negotiable instrument where the payor 110 uses an agent location 400 is shown. In this embodiment, the payor 110 remains external to the system 100 without the need for personally interfacing with the payment enabler 170. The depicted portion of the process begins in step 674 where the payor 110 provides money at an agent location 125. The money could be in the form of cash, a credit card or a check. In step 678, the agent enters an identifier for the payee 130, such as an e-mail address. In step 682, the agent enters a money amount for that payee 130. The agent interface 180-4 is used to enter the identifier and amount. The remainder of the process 670 is largely the same as the embodiment of FIG. 6A.

Some embodiments may avoid step 536 where a possibly-temporary stored value fund is created for the payee if the payee doesn't already have one in the case of an external payout as determined in step 640. The amount would go directly to the handler that prints the negotiable instrument for pick-up or mailing. Other embodiments may load the amount into a stored value fund of the payor before transferring that amount to the stored value fund of the payee.

Figure 7:
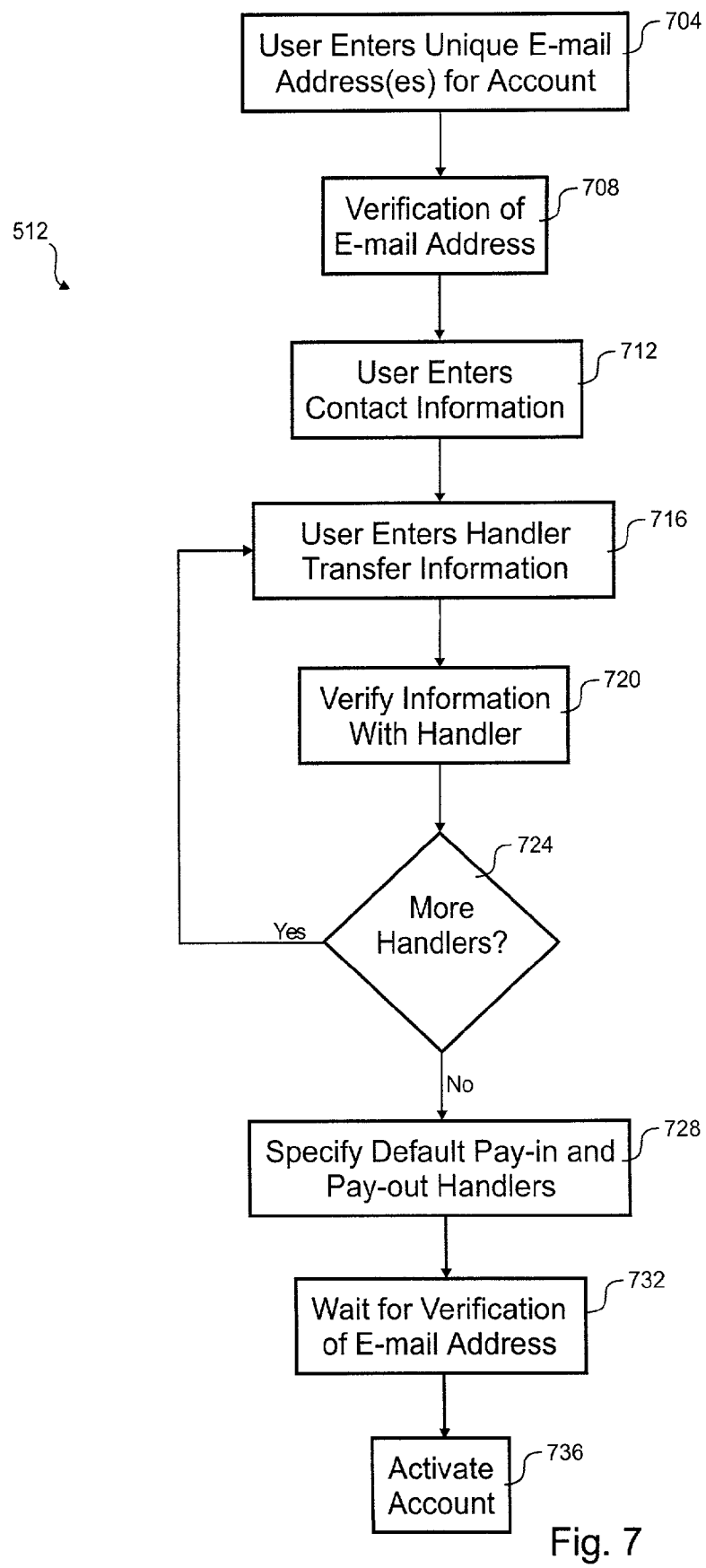
FIG. 7 is a flow diagram of an embodiment of a process for configuring a user with an account for the online money transfer system.

Referring next to FIG. 7, a flow diagram of an embodiment of a process 512 for configuring a user with an account with the online money transfer system 100 is shown. Where the payee 130 or payor 110 is not external to the system, an account with the payment enabler 170 is created. The depicted portion of the process 512 begins in step 704 where the user 110, 130 enters an e-mail address as the unique identifier for the account. The user may want to enter any other e-mail addresses that may be used by counter parties to a transaction. Other embodiments could use any unique identifier for the user.

Once an e-mail address is given to the payment enabler 170, it is verified. A message is sent to the e-mail address in step 708. A code is provided and an URL such that the user can click on the URL to load a page where the code is entered to verify the email address. In this embodiment, the code is a randomly generated set of alphanumeric characters. Other embodiments could use any number of methods to verify the e-mail address.

The user enters contact information in step 712. This contact information could include address, phone number, pager address, instant message address, wireless phone address, contact e-mail address, etc. In step 716, the user enters handler interface information. For example, the user might enter credit card information and bank transfer information. In step 720, the information is verified with the handler 160 to the extent possible for that handler 160. In step 724, the process 512 can loop back to step 716 for entering and verifying additional handlers.

In step 728, a default input handler 160 and a default output handler 160 can be chosen for transferring money into and out of the system 100. These handlers 160 may be different. In step 732, the payment enabler 170 waits for verification at least one of the e-mail addresses before activating the account for sending and receiving money with that e-mail address in step 736.

Figure 8:
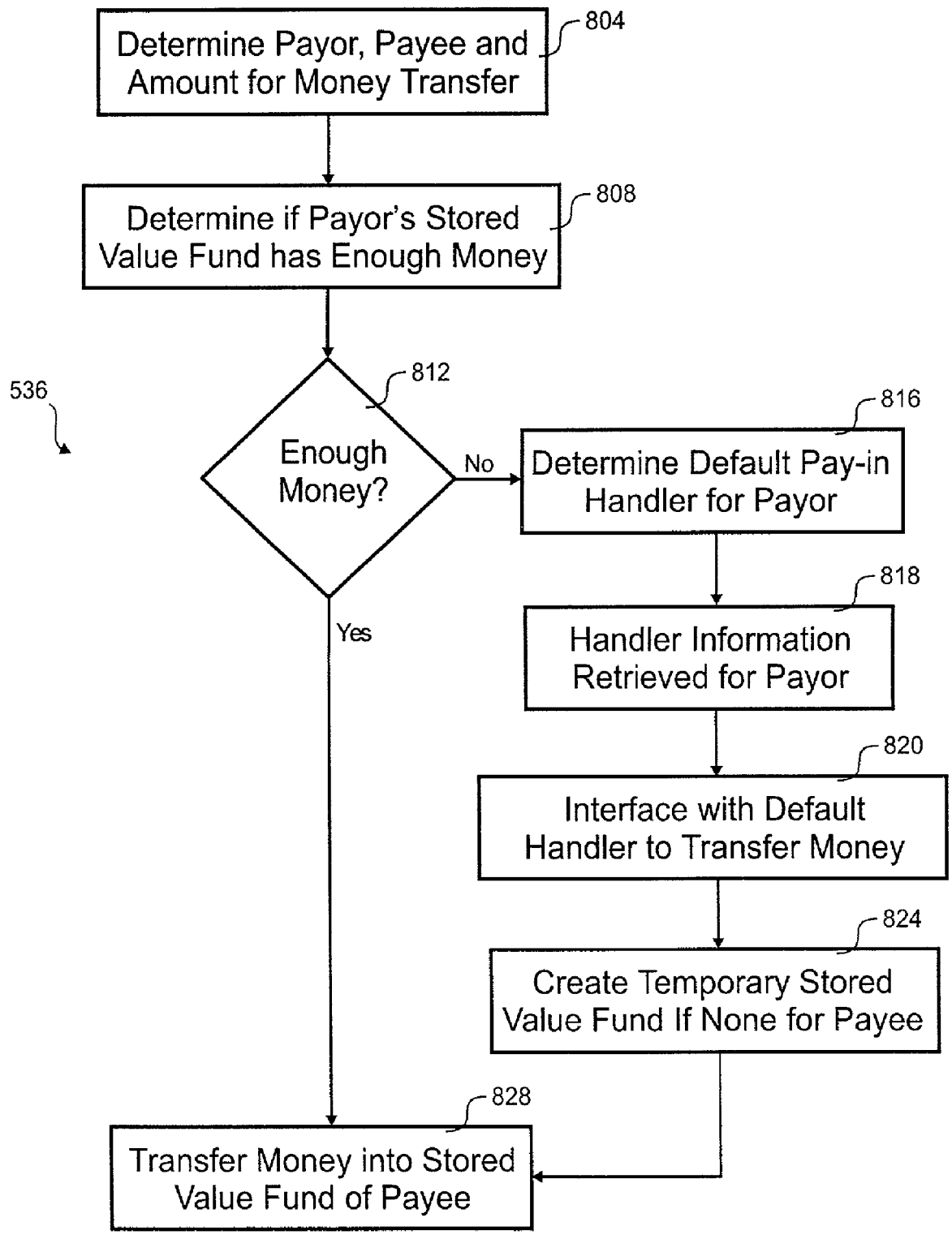
FIG. 8 is a flow diagram of an embodiment of a process for transferring money from the payor to the payee.

With reference to FIG. 8, a flow diagram of an embodiment of a process 536 for transferring money from the payor 110 to the payee 130 is shown. The process 536 describes a transfer between a single payor 110 and a single payee 130, but a number of these processes 536 could be performed in parallel where there are a number of payees 130. The depicted portion of the process begins in step 804 where the payee 130, payor 110 and amount are determined for the money transfer. In step 812, it is determined if the stored value fund of the payor 110 has enough money to fund the transfer to the payee 130.

Where there is not sufficient funds in the stored value fund, processing continues to step 816 to load funds. In step 816, the default pay-in handler 160 is determined. The information used to transfer money from the handler 160 into the payment enabler 170 is retrieved from the user database 324 in step 818. The payor 110 may be given an opportunity to change the default pay-in handler 160 for this transaction or for all further transactions. Presuming there are no changes, the default handler 160 is interfaced in step 820 to transfer the money. If there is no stored value fund for the payee 130, a temporary fund is created in step 824. A temporary stored value fund can be used for a single transfer, but the payee may want to make the temporary fund permanent by opening an account with the payment enabler 170.

Regardless of whether new money is added or whether existing money is used, processing continues to step 828 from both step 812 and step 824. The money is attributed to the payees 130 stored value fund to the detriment of the payor's stored value fund in step 828. In other embodiments, the money is transferred directly from the payor's handler 160 to the stored value fund of the payee 130. In some embodiments, the payor can select a future time that payment is made such that the payment is configured now, but completed at the future time.

Figure 9A:
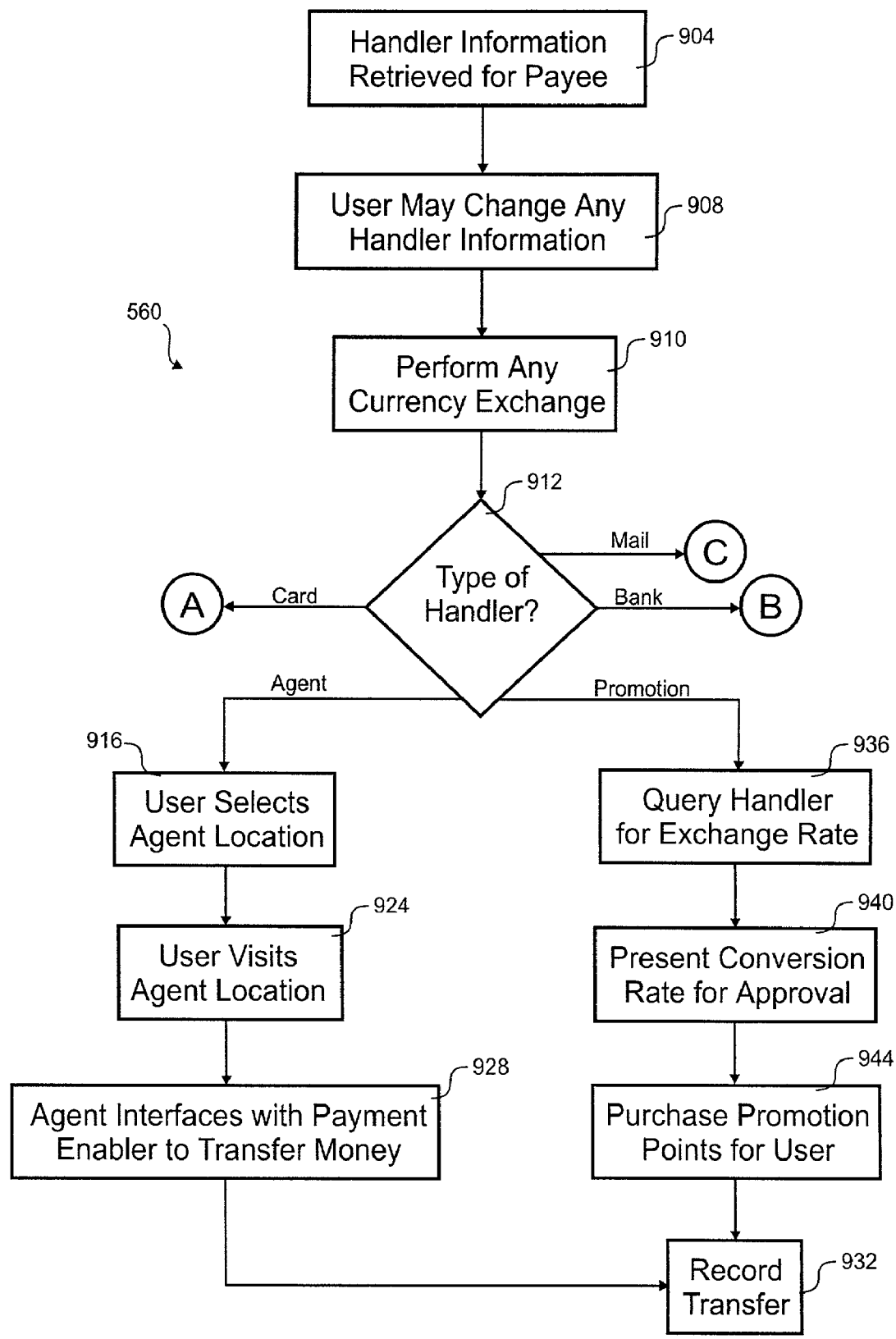
FIGS. 9A and 9B are a flow diagram of an embodiment of a process for moving money out of a stored value fund for a user.
Figure 9B:
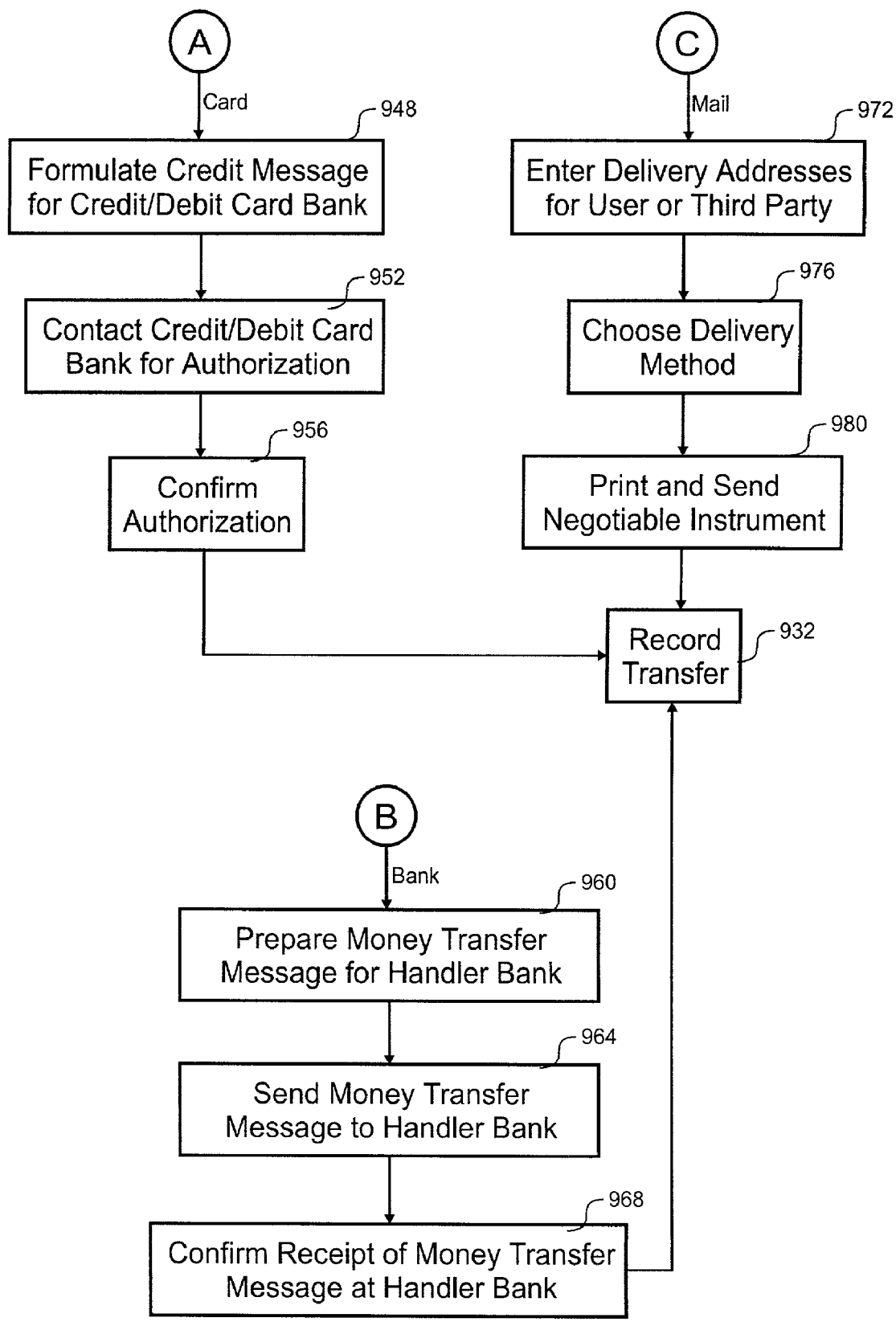

Referring next to FIGS. 9A and 9B, a flow diagram of an embodiment of a process 560 for moving money out of a stored value fund of a user is shown. This embodiment allows paying-out money in at least five different ways, namely, by: pick-up at an agent location 125, exchanging with some promotion, a credit to a debit or credit card, a credit to a bank account, and mailing a negotiable instrument. The depicted portion of the process 560 begins in step 904 where the default pay-out handler information is retrieved for the payee 130. In step 908, a web page is presented that allows the payee 130 to select a different handler 160 or to change information for the handler 160.

A user may have a number of currencies of money in their stored value fund. The user may select some or all of the different currencies for paying out. In many cases, the handler 160 only accepts money in a single currency or the user may simply wish to exchange money to another currency. In step 910, the currency is exchanged. The exchange rate database 332 is queried for the current rate that is applied by the payment conversion function 328.

In step 912, processing branches in one of five directions depending on the type of handler the user has chosen. The first two directions are depicted on FIG. 9A and the remainder are depicted on FIG. 9B. One branch beginning in step 916 corresponds to the user visiting an agent location 125 to transfer out money with the assistance of the agent. In step 916, the user selects an agent location 125 that is convenient. The user visits the agent location 125 in step 924 to either use a kiosk interface 180-2 or use the agent. In this embodiment, the user interfaces with the agent who uses the agent interface 180-4 to the payment enabler 170. From the agent interface 180-4, the agent can transfer the money to any handler 160, can print a negotiable instrument or can provide cash to the user. The transfer is recorded by the payment enabler 170 in step 932.

In another branch that begins in step 936, a promotion program is chosen as the handler 160-1. Either the promotion handler 160-1 or the exchange rate database 332 can be queried in step 936 to determine the exchange rate for program credits or points. In step 940, the conversion rate is presented to the user for approval. Presuming the rate is approved, the promotion credits or points are purchased in step 944 by interfacing with the promotion handler 160-1. The payout of money to the promotion handler 160-1 is recorded in step 932.

In yet another branch that begins in step 948 of FIG. 9B, a credit card or debit card is used to transfer out money from the system 100. In step 948, a credit message is formulated for the card bank. In some embodiments, the identity of the card holder may be further verified by entry of a PIN or other verification method. The card bank is contacted in step 952 for authorization of the credit. Authorization of the credit is performed in step 956. The payout is recorded with the payment enabler 170 in step 932.

In the branch labeled "B," a bank transfer is used to payout money from the system 100. In step 960, an EFT message is formulated for the handler bank 160-4. The EFT message is sent to the handler bank 160-4 in step 964. Receipt of the EFT message is confirmed by the handler interface 308 in step 968 and the transfer is recorded in step 932.

In the branch of FIG. 9B labeled "C," a negotiable instrument is printed and sent to the user. In step 972, the user enters the delivery address and a name to pay the negotiable instrument to. The user can send the negotiable instrument to herself or a third party. A delivery method for sending the negotiable instrument is chosen in step 976. In step 980, the negotiable instrument is printed or otherwise produced and sent. The payout is recorded in the user database in step 932.

Figure 10:
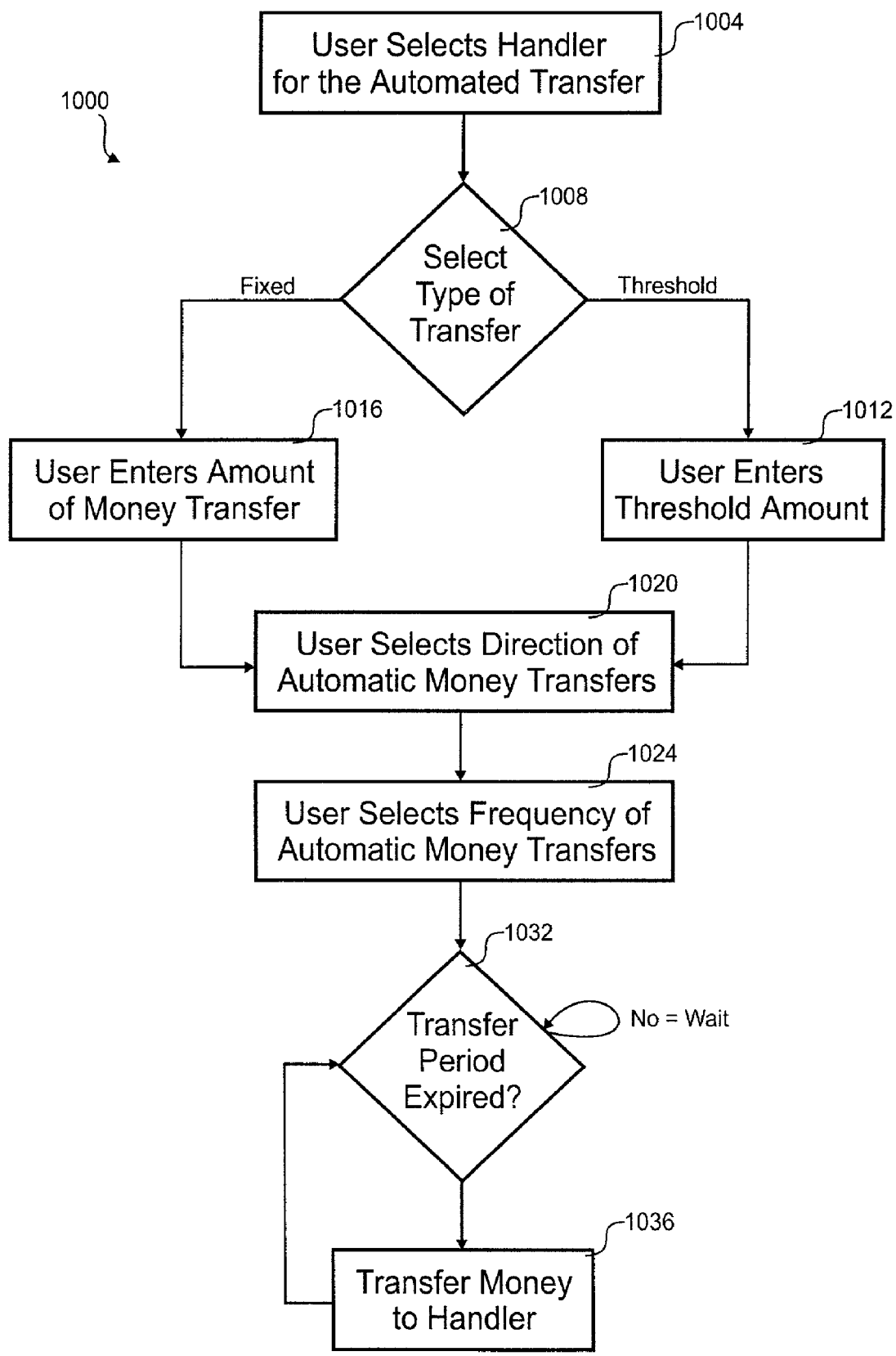
FIG. 10 is a flow diagram of an embodiment of a process for automating future transfers that uses the online money transfer system.

With reference to FIG. 10, a flow diagram of an embodiment of a process 1000 for automating future transfers is shown that uses the online money transfer system 100. In some circumstances, a user may want to automate the payout or payin of money from or to her stored value fund. There are two types of automated transfers, namely, threshold and fixed transfers. Threshold transfers aim to maintain a specified amount of money in the stored value fund such that money is either transferred in or transferred out to maintain that specified amount. Fixed transfers pay-in or pay-out a fixed money amount according to specified frequency.

The depicted portion of the process 1000 begins in step 1004 where the user selects a handler 160 for the automated transfer. In step 1008, the type of automated transfer is selected. For a threshold transfer, the user enters the threshold amount in step 1012 as a trigger condition. For a fixed amount transfer, the user enters the amount of the transfer in step 1016. Once the type of transfer is chosen, the direction of the transfer is selected in step 1020 such that money is automatically added or removed from the stored value fund.

A frequency for the automatic transfers is chosen in step 1024. For fixed transfers, the fixed amount is transferred at that frequency such that the period expiring is the trigger condition. For example, $50 could be transferred into the stored value fund weekly. For the threshold transfers, the transfer threshold is tested at the specified frequency. For example, once a day any balance in excess of $1,000 is transferred out of the stored value fund. In step 1032, a test is performed for the frequency period expiring. When the period expires, money may be transferred in or out of the stored value fund in step 1036. After any transfer, processing loops back to step 1032.

Some embodiments could notify the user when an automated transfer occurs. Although the embodiment of FIG. 10 only describes a single automated transfer, other embodiments could allow multiple automated transfers having various types and transfer periods. Further, some embodiments could transfer amounts over/under the threshold amount whenever overage/underage occurs without waiting for the transfer period to expire.

Figure 11A:
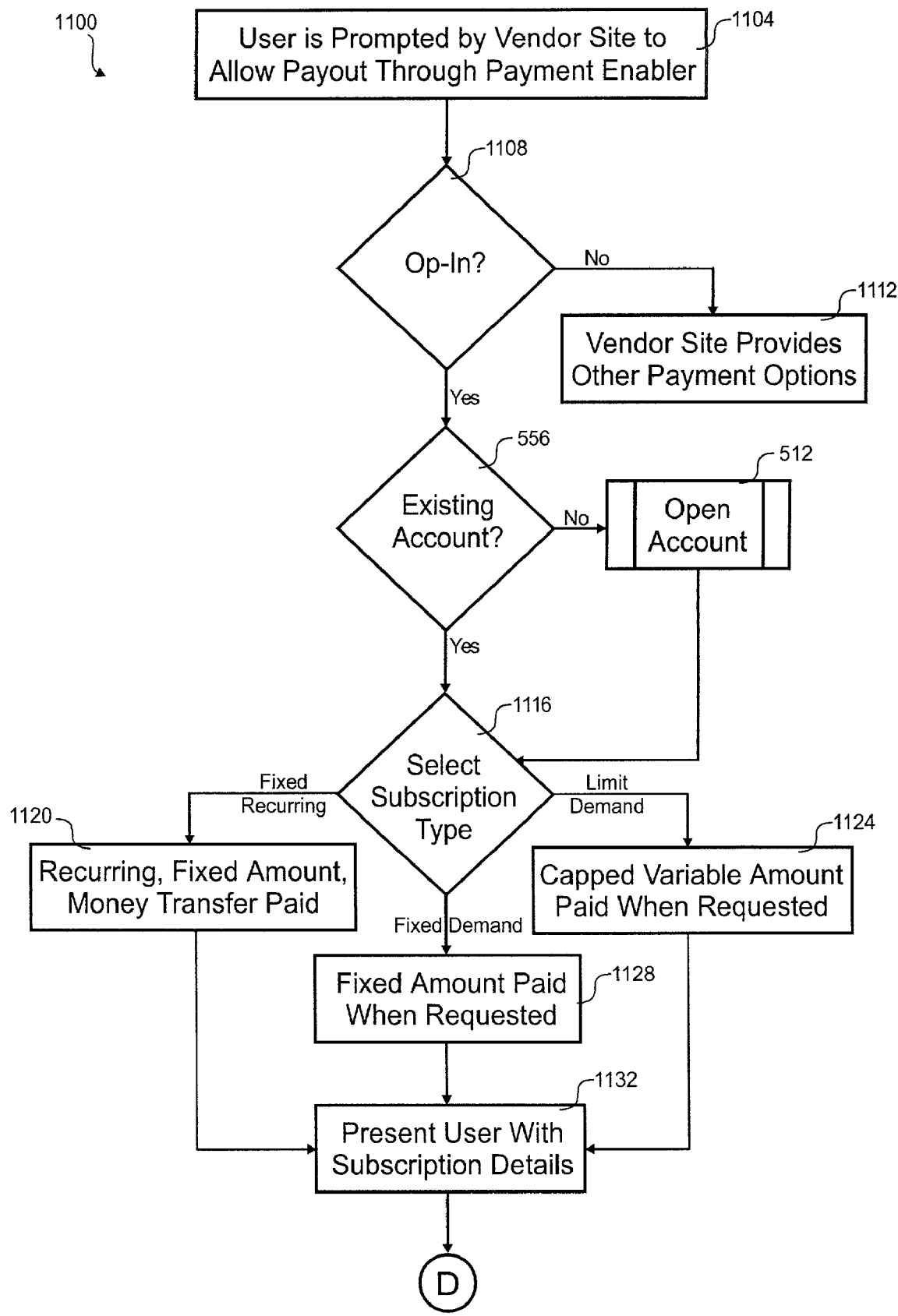
FIGS. 11A and 11B are a flow diagram of an embodiment of a process for subscribing to automated transfers.
Figure 11B:
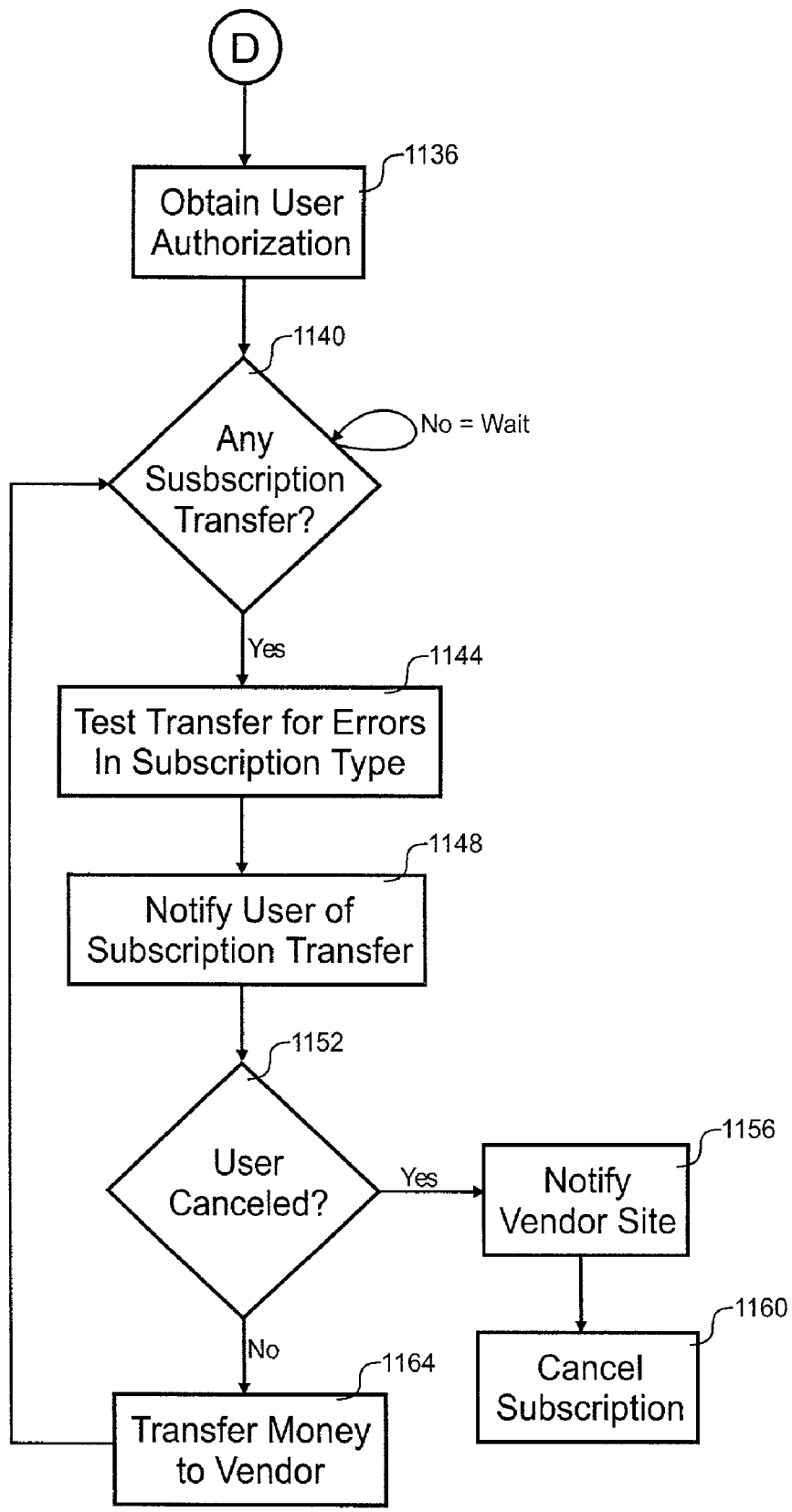

Referring next to FIGS. 11A and 11B, a flow diagram of an embodiment of a process 1100 for subscribing to automated transfers is shown. Under certain circumstances, a user may wish to pay for recurring charges or a future transfer with her stored value fund. If a vendor site accepts subscriptions, the user can configure payment in this way. In this embodiment, there are three different types of subscriptions, namely: a recurring and fixed amount is transferred, a fixed amount is transferred whenever requested and a variable amount is transferred when requested so long as it does not exceed a limit. Other embodiments could arrange other subscription transfers between a user and a vendor.

The depicted portion of the process 1100 begins in step 1104 where the user is prompted by the vendor site to allow payout through the payment enabler 170. If the user does not want to pay with her stored value fund as determined in step 1108, the vendor site may provide other payment options in step 1112. Presuming the user wants to payout from the stored value fund in step 1108, processing proceeds to step 556 where an account is opened for the user in step 512, if necessary.

So long as an account is open for the user, processing continues from either step 556 or step 512 to step 1116 where the subscription type is selected by the vendor and presented to the user. In some embodiments, the user may be presented with a couple of subscription choices that can be selected.

There are three branches from step 1116 for the three transfer options, namely, a recurring and fixed transfer amount is selected in step 1120, a fixed transfer amount is transferred whenever requested by the vendor in step 1128, or a capped, variable, amount is transferred whenever requested in step 1124. The fixed, on-demand, payment in step 1120 can have its period limited by the user such that only a number of payments is available in a period, such as once a month. The capped, variable, amount branch of step 1124 could be further limited such that only a maximum amount is allowed for a period of time.

Once the vendor chooses a subscription type, it is presented to the user in step 1132. The user authorizes the automatic transfers in step 1136. In step 1140, the payment enabler waits for an automatic transfer. In this embodiment, the vendor initiates the transfer, however, some embodiments could have the payment enabler 170 contact the vendor at a defined frequency for fixed or variable payments. For example, a ten dollar fee could be paid every business day to the vendor without solicitation.

Where an automatic transfer is requested by the vendor, that request is check by the payment enabler 170 in step 1144 before fulfillment. The user can put frequency and/or amount limitations on transfers to the requesting vendor. If an attempt to violate the limit is detected, the vendor and/or the user is notified. The user may adjust the limits in view of the attempt to exceed the limit.

An electronic notification is sent to the user of the transfer when accepted by the payment enabler 170. The user can specify whether these notifications are sent or under which circumstances they should be sent. For example, the notification could include vendor information, a description of the goods and an amount for transfer. For a period of time, the transfer is pending and can be canceled by the user. In step 1152, the user can cancel the transfer, whereafter, the vendor site is notified in step 1156 and the subscription may be canceled or suspended by the vedor in step 1160. If the transfer is not canceled during pendency, the money is transferred to the stored value fund of the user in step 1164. In some embodiments, the money is transferred directly to the handler 160 pre-specified by the payee so as to skip-over the stored value fund of the user.

A number of variations and modifications of the invention can also be used. For example, when sending a printed check to a payee a telegram or greeting card can be enclosed therewith. Additionally, an electronic greeting card sent to the payee could include a payment notification. The payment notification would include a link to the payment enabler such that the payee could easily retrieve the money from the system.

While the principles of the invention have been described above in connection with specific apparatuses and methods, it is to be clearly understood that this description is made only by way of example and not as limitation on the scope of the invention.

What is claimed is:

1. A method for transferring credit from a sender to a plurality of recipients using an Internet, the method comprising:
receiving at a server computer system information from a sender to transfer credit to a plurality of recipients, wherein:
the information includes a plurality of credit amounts for the plurality of recipients wherein at least two of the plurality of credit amounts are different amounts, and
a sum of a plurality of credit amounts is related to an aggregate credit amount;
receiving a first choice of a first handler from a group of two or more different types of handlers, the first choice chosen by the sender by interaction with server computer system to select from the two or more different type of handlers;
requesting credit transfer from the first handler;
receiving at the server computer system the aggregate credit amount from the first handler;
receiving two or more choices of two or more second handlers from a group of two or more handlers, the two or more second choices respectively chosen by the plurality of recipients by interaction with server computer system to select from a plurality of different types of handlers; and
sending the plurality of credit amounts to the plurality of second handlers.

2. The method for transferring credit from the sender to the plurality of recipients using the Internet as recited in claim 1, further comprising a step of providing electronic notification from the server computer system to the plurality of recipients by e-mail.

3. The method for transferring credit from the sender to the plurality of recipients using the Internet as recited in claim 2, wherein the electronic notification includes at least one of an instant message and an e-mail message.

4. The method for transferring credit from the sender to the plurality of recipients using the Internet as recited in claim 1, wherein the first listed receiving step comprises receiving a file comprising the information.

5. The method for transferring credit from the sender to the plurality of recipients using the Internet as recited in claim 1, wherein the first handler and two or more second handlers are of different types, wherein the types are chosen to include at least four from a bank, a credit card company, a debit card company, an agent location, a stored value fund, an airline mileage program, a gift certificate issuer, an electronic gift certificate issuer, and a money order issuer.

6. The method for transferring credit from the sender to the plurality of recipients using the Internet as recited in claim 1, wherein the sending step can comprise a sub-step chosen from at least two of the following steps:
sending a credit amount to a bank account of one of the plurality of recipients;
sending the credit amount to a credit card or debit card of the one;
sending the credit amount as a check or money order to the one;
sending the credit amount to a stored value fund of the one;
sending the credit amount to an agent location chosen by the one;
sending a telegram or greeting card with a check or money order to the one; and
sending an electronic greeting card to the one with an electronic payment notification embedded therewith.

7. The method for transferring credit from the sender to the plurality of recipients using the Internet as recited in claim 1, further comprising steps of:
receiving a trigger condition for a stored value fund of the sender; and
automatically transferring credit from the stored value fund of the sender when the trigger condition is satisfied.

8. The method for transferring credit from the sender to the plurality of recipients using the Internet as recited in claim 1, further comprising steps of:
receiving a request for a credit transfer;
evaluating the request against a defined parameter; and
performing the credit transfer from a stored value fund of the sender so long as the request is within the defined parameter.

9. The method for transferring credit from the sender to the plurality of recipients using the Internet as recited in claim 1, delaying the sending step until a future time specified by the sender.

10. A method for transferring credit from a sender to a plurality of recipients using an Internet, the method comprising:
receiving at a server computer system information from a sender to transfer credit to a plurality of recipients, wherein:
the information includes a plurality of credit amounts for the plurality of recipients wherein at least two of the plurality of credit amounts are different amounts, and
a sum of a plurality of credit amounts is related to an aggregate credit amount;
determining a first handler chosen by the sender by interaction with server computer system to select from a plurality of different types of handlers;
requesting credit transfer from the first handler;
receiving at the server computer system the aggregate credit amount from the first handler;
storing an amount related to the aggregate credit amount in a stored value account of the sender;
storing the plurality of credit amounts in a plurality stored value accounts respectively allocated to the plurality of recipients;
determining a plurality of second handlers respectively chosen by the plurality of recipients by interaction with server computer system to select from a plurality of different types of handlers; and
sending the plurality of credit amounts to the plurality of second handlers.

11. The method for transferring credit from the sender to the plurality of recipients using the Internet as recited in claim 10, wherein the first listed receiving step comprises receiving a file comprising the information.

12. The method for transferring credit from the sender to the plurality of recipients using the Internet as recited in claim 10, wherein the first handler and the plurality of second handlers can be different and can be chosen to include at least three of a bank handler, a credit card handler, a debit card handler, an agent location handler, an airline mileage program handler, a gift certificate handler, an electronic gift certificate handler, and a money order handler.

13. The method for transferring credit from the sender to the plurality of recipients using the Internet as recited in claim 10, wherein the sending step comprises a sub-step that can be chosen from at least three of the following step options:

sending a credit amount to a bank account of one of the plurality of recipients;

sending the credit amount to a credit card or debit card of the one;

sending the credit amount as a check or money order to the one;

sending the credit amount to a stored value fund of the one;

sending the credit amount to an agent location chosen by the one;

sending a telegram or greeting card with a check or money order to the one; and sending an electronic greeting card to the one with an electronic payment notification embedded therewith.

14. The method for transferring credit from the sender to the plurality of recipients using the Internet as recited in claim 10, further comprising steps of:

receiving a trigger condition for the stored value fund of the sender;

automatically transferring credit from the stored value fund of the sender when the trigger condition is satisfied.

15. The method for transferring credit from the sender to the plurality of recipients using the Internet as recited in claim 10, further comprising steps of:

receiving a request for a credit transfer;

evaluating the request against a defined parameter; and performing the credit transfer from the stored value fund of the sender so long as the request is within the defined parameter.

16. The method for transferring credit from the sender to the plurality of recipients using the Internet as recited in claim 10, delaying the sending step until a future time specified by the sender.

17. A method for transferring credit from a sender to a plurality of recipients using a stored value system accessible through an Internet, the method comprising:

receiving at the stored value system information from a sender to transfer credit to a plurality of recipients, wherein:

the information includes a plurality of credit amounts for the plurality of recipients wherein at least two of the plurality of credit amounts are different amounts, and a sum of a plurality of credit amounts is related to an aggregate credit amount;

determining a first handler chosen by the sender by online interaction with the stored value system to select from a plurality of different types of handlers;

requesting credit transfer from the first handler;

receiving at the stored value system the aggregate credit amount from the first handler;

storing an amount related to the aggregate credit amount in a stored value account of the sender;

transferring the plurality of credit amounts to a plurality stored value accounts respectively allocated to the plurality of recipients to debit from the amount stored in the stored value account of the sender;

electronically receiving a selection for each of the plurality of recipients handlers to indicate the plurality of second handlers;

determining a plurality of second handlers respectively chosen by the plurality of recipients by prior interaction with stored value system to select from a plurality of different types of handlers; and sending the plurality of credit amounts to the plurality of second handlers, wherein the plurality of second handlers can be different and are chosen from at least four of a bank handler, a credit card handler, a debit card handler, an agent location handler, an airline mileage program handler, a gift certificate handler, an electronic gift certificate handler, and a money order handler.

* * * * *